(12) United States Patent
Medeiros et al.

(10) Patent No.: US 12,539,727 B2
(45) Date of Patent: Feb. 3, 2026

(54) BOGIE SYSTEMS FOR AUTONOMOUS AND REMOTE-PILOTED VEHICLES

(71) Applicant: Serve Operating Co., Redwood City, CA (US)

(72) Inventors: Chace Francis Medeiros, Raleigh, NC (US); Colin Paul Janssen, Vancouver (CA); Matthew Ryan Medlock, San Francisco, CA (US); David Eugene Gillespie, Los Angeles, CA (US); Graeme Tyler Smith, Vancouver (CA); Ali Haghighat Kashani, San Francisco, CA (US)

(73) Assignee: Serve Operating Co., Redwood City, CA (US)

( * ) Notice: Subject to any disclaimer, the term of this patent is extended or adjusted under 35 U.S.C. 154(b) by 593 days.

(21) Appl. No.: 17/980,722

(22) Filed: Nov. 4, 2022

(65) Prior Publication Data

US 2023/0140923 A1    May 11, 2023

Related U.S. Application Data

(60) Provisional application No. 63/263,753, filed on Nov. 8, 2021.

(51) Int. Cl.
*B60G 17/016*    (2006.01)
(52) U.S. Cl.
CPC ................. *B60G 17/0163* (2013.01)
(58) Field of Classification Search
CPC ...... B60G 17/0163; B60G 5/02; B62D 63/02; B62D 9/00; B60K 2007/0038; B60K 17/358; B60K 7/0007; B60K 17/346; B60K 17/356; B60Y 2400/3015; B60Y 2400/3017; B60Y 2400/4115; F16H 1/16; F16H 48/08

See application file for complete search history.

(56) References Cited

U.S. PATENT DOCUMENTS

| | | | | |
|---|---|---|---|---|
| 4,462,477 | A | * | 7/1984 | Mastro ................. B62D 61/125 280/682 |
| 5,339,611 | A | * | 8/1994 | Roderfeld ............ B62D 61/125 180/209 |
| 6,112,843 | A | * | 9/2000 | Wilcox .................. B60K 17/36 180/209 |
| 2005/0279563 | A1 | * | 12/2005 | Peterson ................ B62D 7/144 180/414 |
| 2018/0312060 | A1 | * | 11/2018 | Varela ................... F16H 37/082 |
| 2019/0001772 | A1 | * | 1/2019 | Dyna ................. B60G 17/0165 |
| 2020/0400226 | A1 | * | 12/2020 | Shinde ................ F16H 57/0443 |

(Continued)

FOREIGN PATENT DOCUMENTS

| | | | | |
|---|---|---|---|---|
| FI | 20205265 | A1 | * | 10/2020 |
| FI | 129208 | B | * | 9/2021 |
| WO | WO-2022262953 | A1 | * | 12/2022 | ............... B60G 5/02 |

*Primary Examiner* — Drew J Brown
(74) *Attorney, Agent, or Firm* — Weaver Austin Villeneuve & Sampson LLP

(57) ABSTRACT

Various systems and techniques for providing enhancements to bogie-equipped vehicles are described and discussed. Such systems and techniques include, for example, actively driven bogie differentials, elevated obstacle mounting techniques, worm-drive steering, parking modes using toe-in or toe-out wheel steering, speed-sensitive steering mode selection, and various other enhancements and techniques.

22 Claims, 19 Drawing Sheets

(56) References Cited

U.S. PATENT DOCUMENTS

| | | | |
|---|---|---|---|
| 2021/0309060 A1* | 10/2021 | Stelman | B62D 63/04 |
| 2021/0323616 A1* | 10/2021 | Fliearman | B60B 37/10 |
| 2022/0016975 A1* | 1/2022 | Fliearman | B60K 17/36 |
| 2022/0340005 A1* | 10/2022 | Fliearman | B60G 21/002 |

* cited by examiner

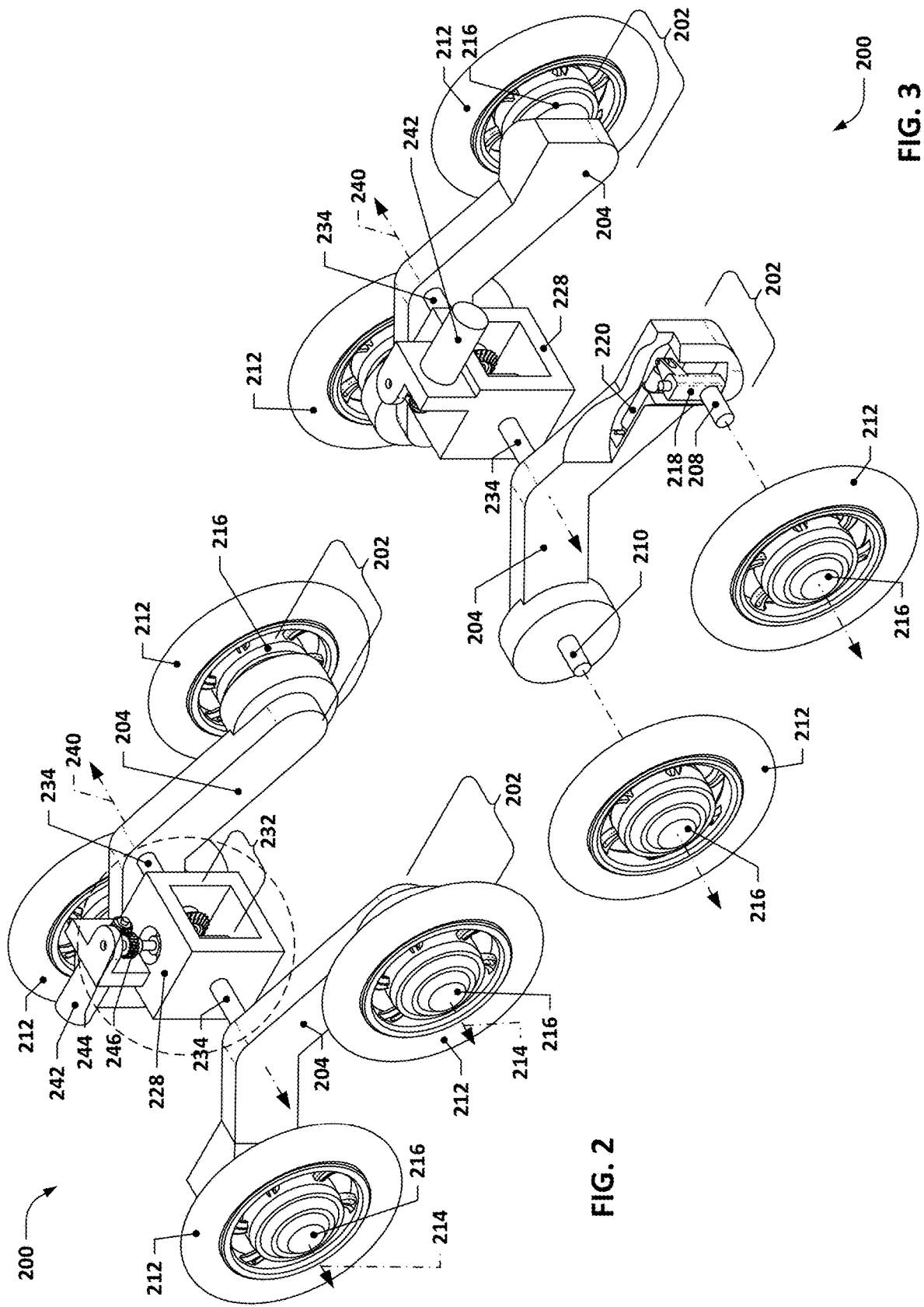

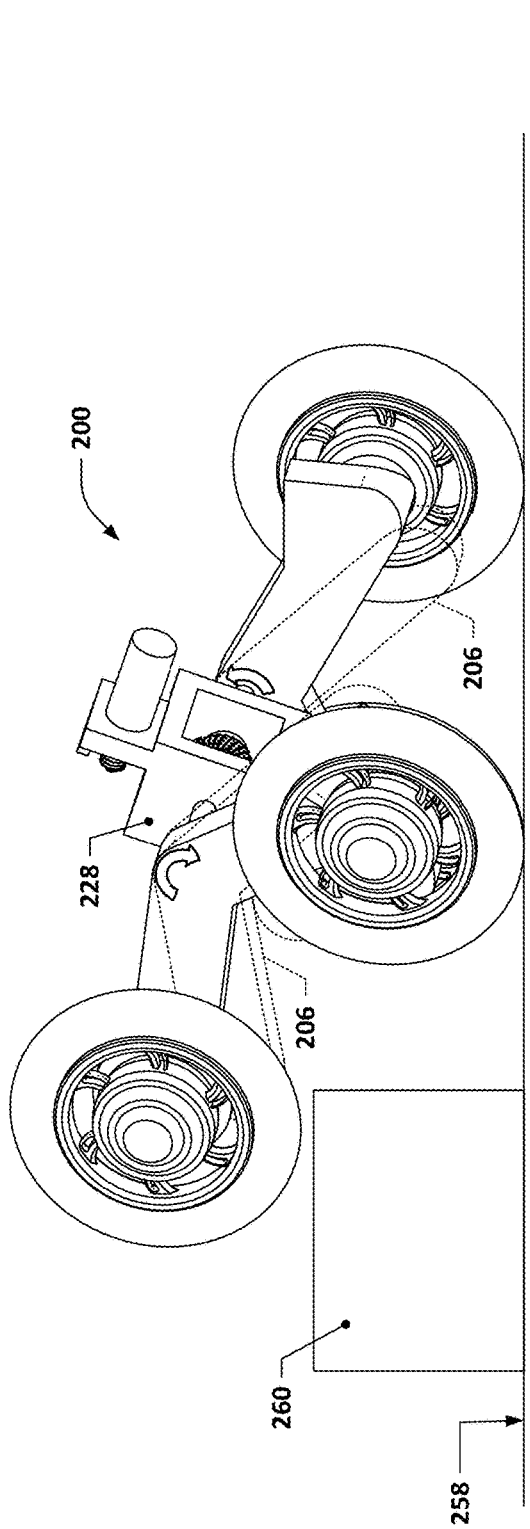
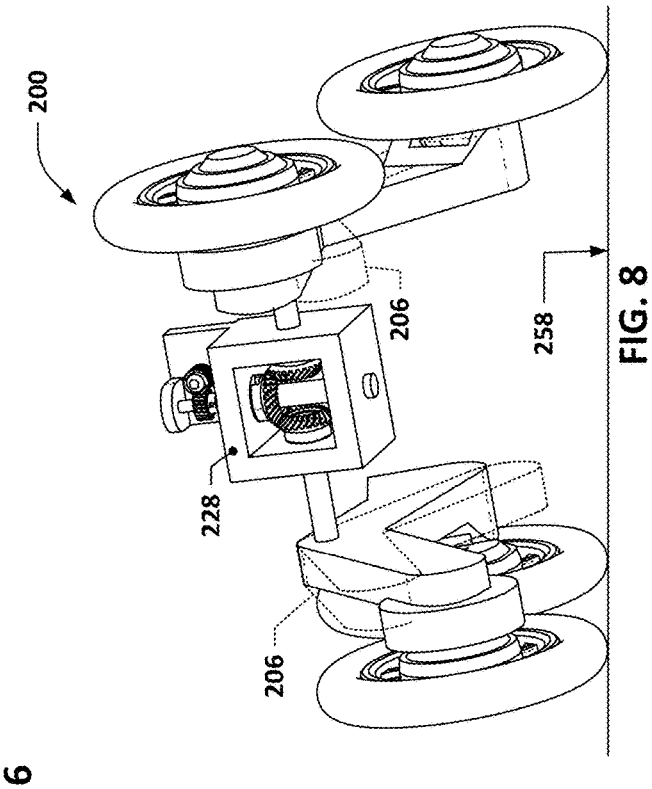
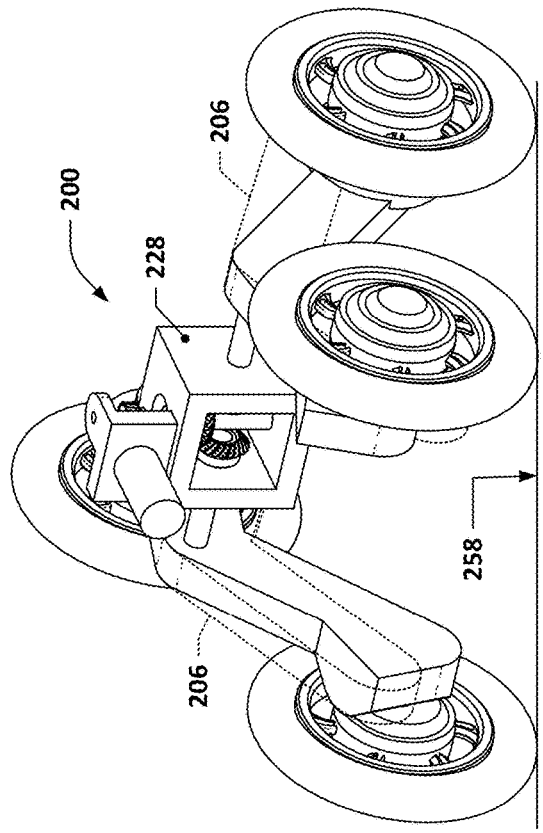
FIG. 6
FIG. 7
FIG. 8

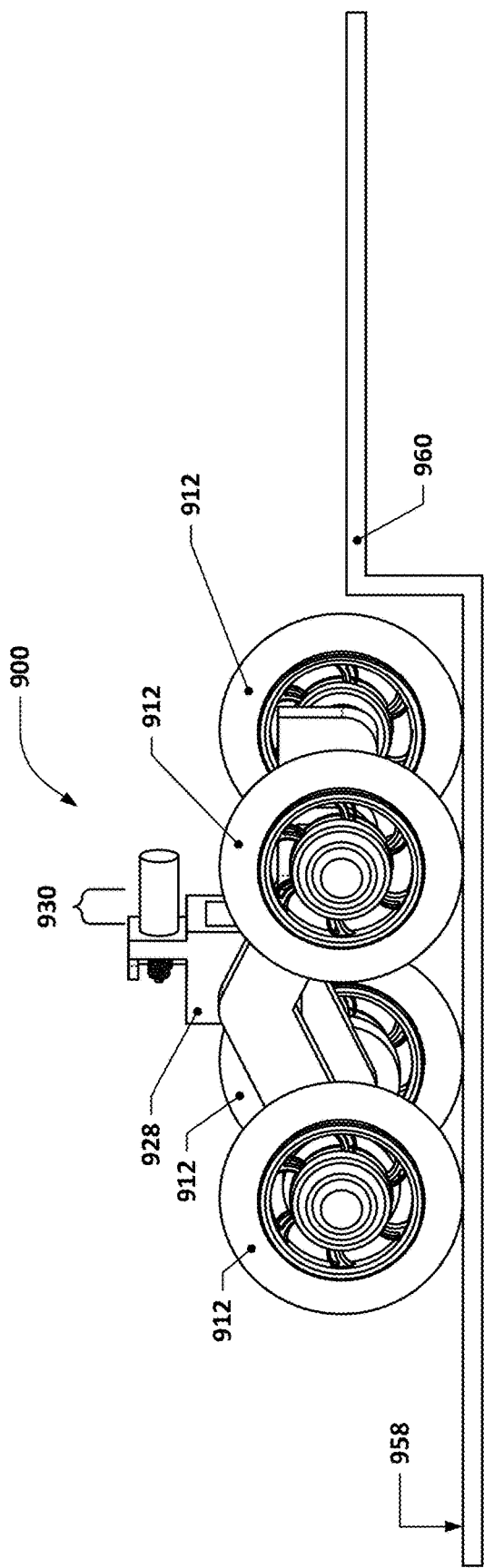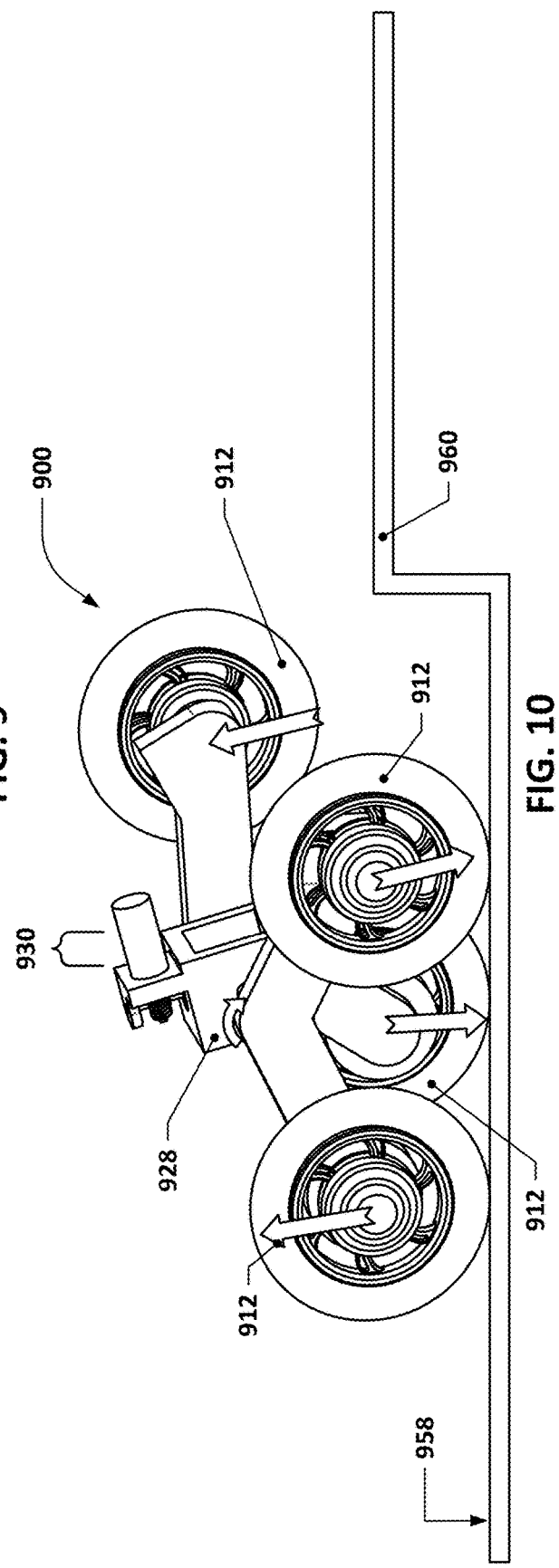

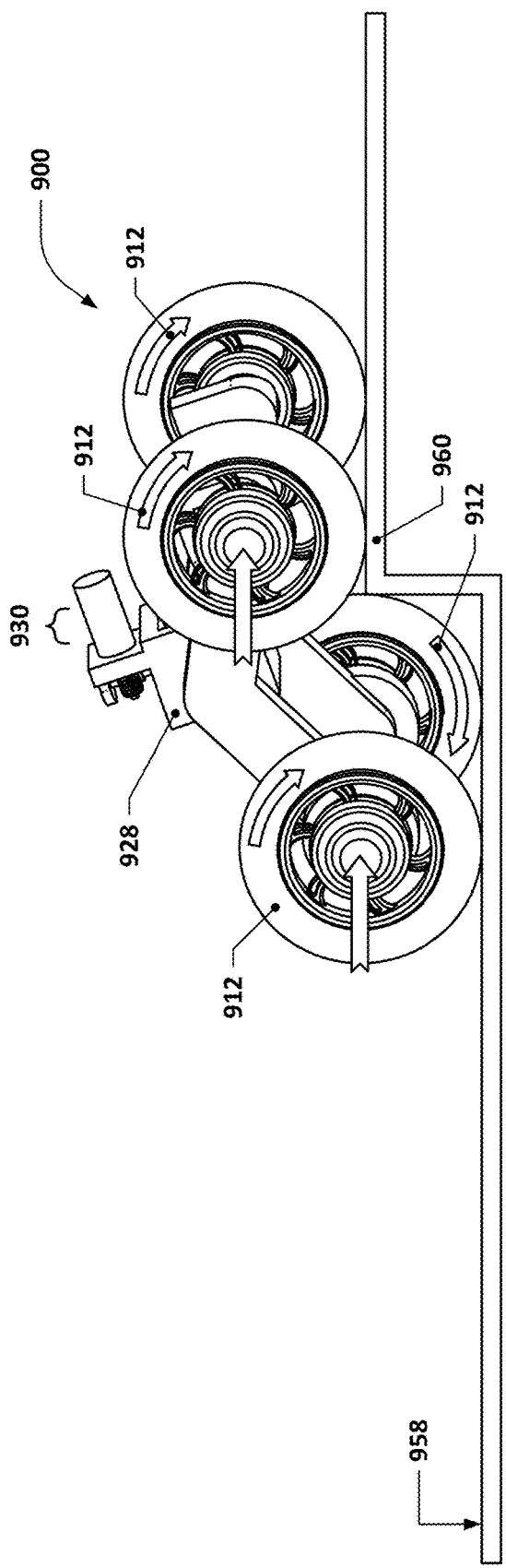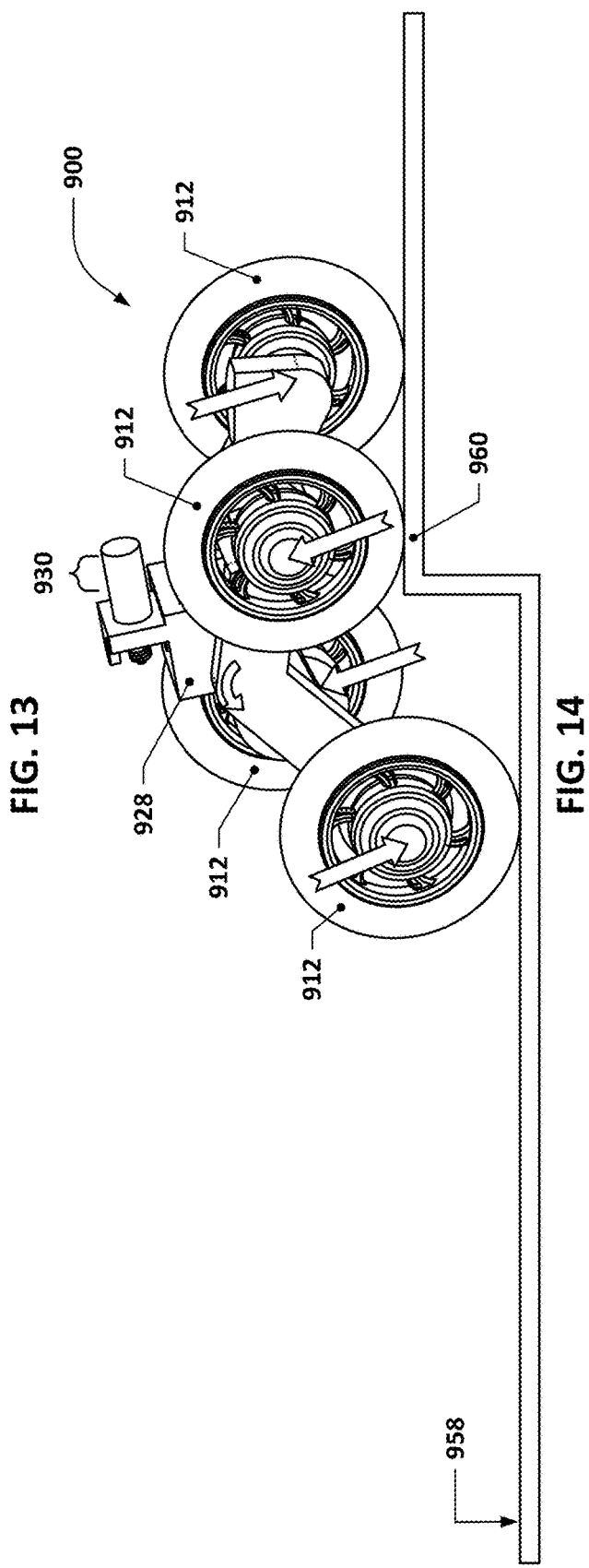

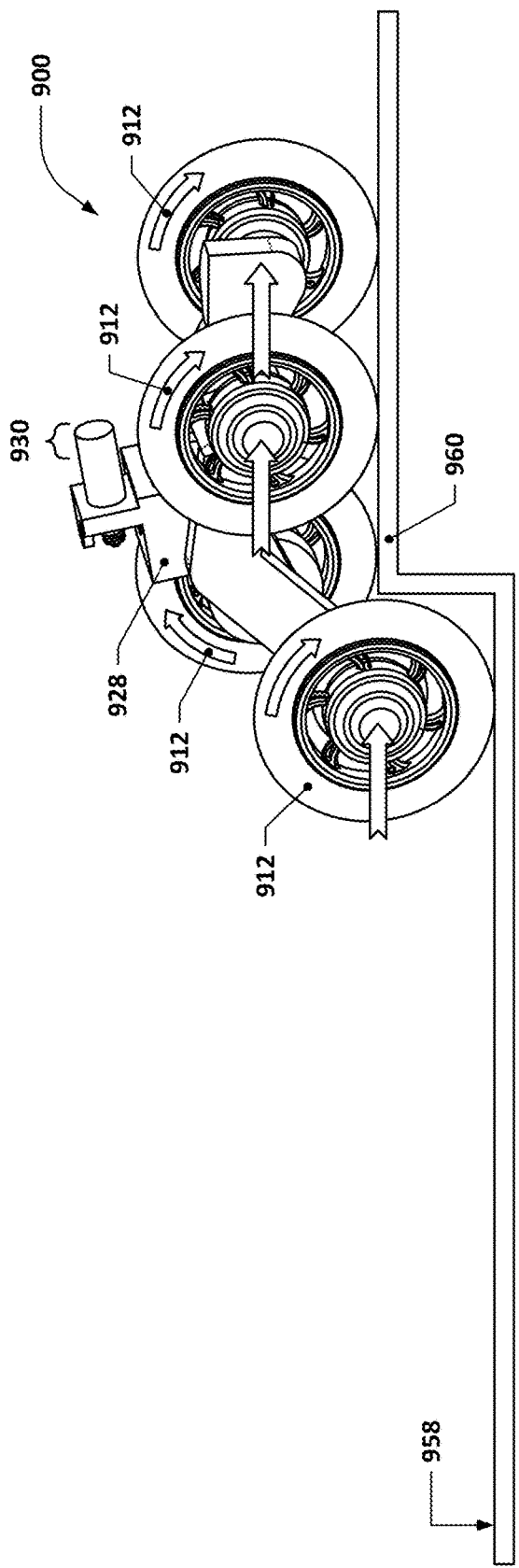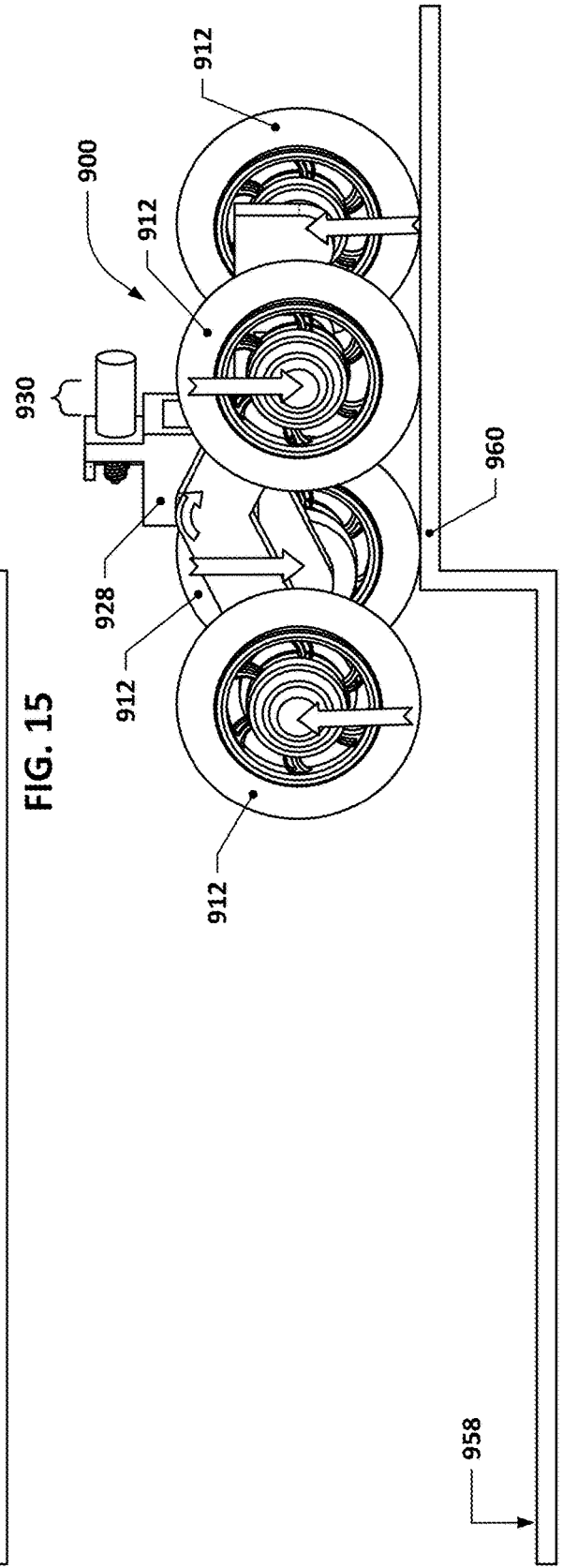

BOGIE SYSTEMS FOR AUTONOMOUS AND REMOTE-PILOTED VEHICLES

INCORPORATION BY REFERENCE

An Application Data Sheet (ADS) is filed concurrently with this specification as part of the present application. Each application that the present application claims benefit of or priority to as identified in the concurrently filed ADS is incorporated by reference herein in its entirety and for all purposes.

BACKGROUND

Disclosed herein are various improvements to bogie systems for autonomous and remote-piloted vehicles, particularly four-wheeled vehicles that utilize two sets of two-wheeled bogies. A bogie is a structure that supports a set of two or more wheels.

SUMMARY

Details of one or more implementations of the subject matter described in this specification are set forth in the accompanying drawings and the description below. Other features, aspects, and advantages will become apparent from the description, the drawings, and the claims.

The concepts presented herein were developed in the course of designing autonomous wheeled delivery robots that feature a chassis that includes, among other things, a cargo storage area, power source (battery or batteries), controller, and sensors. The chassis of such robots is connected with two bogies, each of which supports a pair of wheels. The wheels are powered by hub motors within the wheels, although alternative approaches may place the drive motors for the wheels in the bogies themselves. The bogies are able to move relative to the chassis in order to facilitate travel by the robot over uneven terrain. While the concepts discussed herein were developed for autonomous delivery robots of a generally small size, e.g., similar in size to a shopping cart or baby carriage, it will be understood that such concepts may also be generally applicable to other apparatuses sharing a similar architecture, e.g., bogie-equipped apparatuses. Such alternative apparatuses do not necessarily need to be autonomous and can include remote-piloted vehicles and/or manned vehicles, including wheelchairs (which may be piloted by the occupant, remotely piloted, autonomously piloted, or operable under multiple such control schemes) and lawnmowers (which may be similarly pilotable).

The present disclosure is directed to a number of different enhancements to bogie structures for autonomous, remote-piloted, and live-piloted vehicles. Such a vehicle may have a pair of opposing bogies that may each support a pair of the vehicle's wheels. In some such vehicles, the bogies may be rotatably coupled with a chassis of the vehicle through a differential mechanism of some sort such that when one of the bogies rotates relative to the chassis, the other bogie is caused by the differential mechanism to rotate in the opposite direction (and vice versa).

In some such implementations, the differential mechanism may be an active mechanism, i.e., there may be one or more actuators that may be controlled so as to actively cause the two bogies to rotate in opposite directions responsive to receipt of one or more control signals. Such systems may, for example, allow the bogies to be actively controlled so as to allow the vehicle to raise one wheel up off the ground so as to allow the vehicle to mount an obstacle, such as a curb or step.

In some such systems with active differential mechanisms, the differential mechanism may be equipped with a slip mechanism that may allow for some limited amount of actuation of the differential actuator without any corresponding movement of the bogies before the slip mechanism engages and causes the torque or forces generated by the differential actuator to actually be transferred to the bogies, thereby causing their rotation in opposite directions. Such implementations allow for small amounts of movement of the bogies to be passively driven by the terrain that the bogies may traverse, e.g., small displacements due to surface roughness, small obstacles, etc., but also allow for the differential actuator to be selectively engaged when greater amounts of displacement are needed in one of the wheels in order to surmount an obstacle such as a curb.

In another version of such systems, the slip mechanism may be replaced by a specialized control algorithm that may cause a motor that is used as the differential actuator to be powered to a point where the differential does not move due to the motive force provided by the motor, but also where the motor provides no or almost no resistance to movement of the differential due to the application of forces or torques external to the motor.

In some implementations, the bogies of such vehicles may be equipped with steerable front and/or rear wheels, each such steerable wheel being caused to change its steering angle responsive to input provided by a corresponding steering actuator. The steering angle, as the term is used herein, refers to the angle by which a wheel is generally rotated from a neutral position in order to negotiate a turn, where the neutral position is the position the wheel would be in when the vehicle is travelling straight. Since each bogie has its own steering actuator(s) for its steerable wheel(s), this allows each steerable wheel to be independently controlled by a controller of the vehicle. This, in turn, allows for such vehicles to implement a variety of steering strategies that may provide performance benefits in the form of better handling, cornering, and high- and low-speed stability.

For example, in some implementations, the controller of the vehicle may be configured to cause the steering actuators of the bogies to control the steering angles of the steerable wheels in a turn such that the steerable wheels change their steering angles consistent with Ackermann steering geometry, e.g., such that the steerable wheels of the vehicle are each rotated to a steering angle that causes the rotational axes of the wheels of the vehicle to all meet at a single common point (when viewed from above).

In some additional such implementations, the controller may implement such Ackermann steering behavior in a closed-loop fashion that monitors the rotational state of each steerable wheel (with respect to the steering angle thereof) so that the steerable wheels maintain Ackermann steering geometry throughout the range of their travel. Such implementations may help ensure that the Ackermann steering geometry is maintained throughout a turn even if there are issues with the one or more of the steering actuators that cause one or more of the steerable wheels to not change its steering angle as expected.

In some implementations, the steering angles of the steerable wheels of such a vehicle may be controlled differently depending on the speed of the vehicle. For example, in some implementations, such a vehicle may switch between, for example, Ackermann steering geometry and one or more other types of steering geometry (parallel, reverse Ackermann, or a steering geometry in between any of those types of geometry). Such systems may allow such vehicles to change from Ackermann steering, which may be very suitable for low-speed maneuvering, at low speeds to parallel or reverse Ackermann steering, which may be more suitable than Ackermann steering at higher speeds, at higher speeds.

In some implementations, the steering actuators that are used to change the steerable wheels' steering angles may, for example, be provided by rotational motors that drive a worm gear that engages with a pinion gear that is fixed with respect to an upright that supports a steerable wheel. Such implementations allow such vehicles to make very fine steering angle adjustments that may allow for more precise maneuvering, but also allow the steerable wheels to be "parked" in a particular position that makes it impossible for the vehicle to roll away without having at least one of the wheels skid across the ground. For example, such steering actuators may be actuated so as to cause two opposing steerable wheels to both be turned inward by the same angular amount, effectively making the vehicle pigeon-toed when parked. If worm gears are used in the steering actuator drivetrain, this makes it impossible to back-drive the steering actuator, making it impossible for the parked steerable wheels to accidentally straighten absent active participation of the controller and steering actuators—even when power to the vehicle is completely lost. This may further enhance the safety and security of such vehicles.

BRIEF DESCRIPTION OF THE DRAWINGS

The various implementations disclosed herein are illustrated by way of example, and not by way of limitation, in the figures of the accompanying drawings, in which like reference numerals refer to similar elements.

FIG. 2 depicts an isometric view of an example apparatus equipped with bogies

FIG. 3 shows the example apparatus of FIG. 2 but partially exploded and from an opposite side.

FIGS. 6 through 8 depict various views of an example apparatus with a differential mechanism being actively controlled by a differential actuator so as to cause bogies of the apparatus to actively counter-rotate.

FIGS. 9 through 17 depict views of an apparatus equipped with twin bogies, similar to that discussed above with respect to FIGS. 2 through 8, during various stages of mounting an elevated feature, e.g., a curb.

The above-listed Figures are provided by way of example only and are not intended to be limiting. Other implementations of the concepts described herein and shown in the Figures will be evident to those of ordinary skill in the art reading this disclosure and are also considered to be within the scope of this disclosure.

DETAILED DESCRIPTION

Importantly, the concepts discussed herein are not limited to any single aspect or implementation discussed herein, nor to any combinations and/or permutations of such aspects and/or implementations. Moreover, each of the aspects of the present invention, and/or implementations thereof, may be employed alone or in combination with one or more of the other aspects and/or implementations thereof. For the sake of brevity, many of those permutations and combinations will not be discussed and/or illustrated separately herein.

Figure 1:
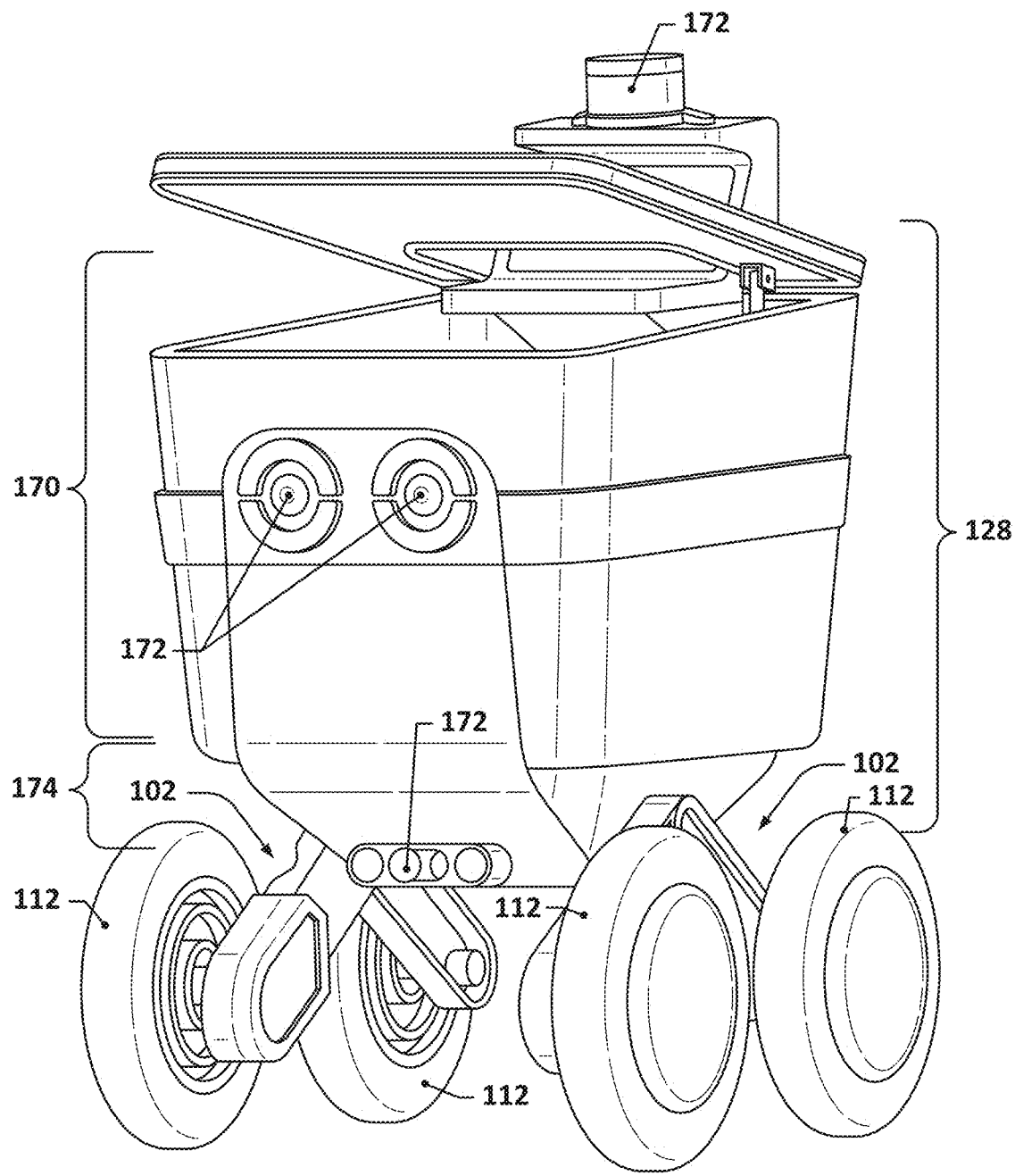
FIG. 1 depicts a rendering of an example autonomous vehicle that may be improved through implementation of one or more of the concepts discussed herein.

FIG. 1 depicts a rendering of an example autonomous vehicle that may be improved through implementation of the one or more of the concepts discussed herein. As can be seen, the vehicle in question includes a chassis 128 that is connected with two bogies 102 that are each connected with two wheels 112. The chassis 128 includes a cargo compartment 170 and a battery compartment 174, and supports a plurality of sensors 172 that may include imaging sensors, lidar and/or radar sensors, proximity sensors, etc. that may provide data to an onboard controller that controls various systems of the vehicle, e.g., drive motors for the wheels 112, steering actuators, differential actuators (if used), etc. The remaining Figures in this disclosure generally show the chassis as a relatively small housing that acts as a bridging structure between the two bogies, but it will be appreciated that the chassis may, as shown in FIG. 1, be much larger than the structure that is shown in the remaining Figures and may support or include various additional components, including, but not limited to, one or more of the specific example components or structures discussed above.

FIG. 2 depicts an isometric view of an apparatus 200 equipped with bogies; FIG. 3 shows the same apparatus but partially exploded and from an opposite side. The apparatus 200 includes a chassis 228 that includes a differential mechanism 232 that has two rotatable parts 234, each of which is rotatable relative to the chassis 228. The differential mechanism 232 is configured such that rotational movement of one rotatable part 234 relative to the chassis 228 and about a common axis 240 causes the other rotatable part 234 to rotate relative to the chassis in the opposite direction and about the common axis 240.

Each rotatable part 234 is connected with a corresponding bogie 202, e.g., to a bogie structure 204 of the corresponding bogie 202. The bogie structures 202 may, for example, be shallow V-shaped structures in which the rotatable part 234 connected therewith connects with the bogie structure 204 near the inflection point of the V, while wheels 212 may be connected with the ends of the V. Other types and shapes of bogie structure 204 may also be used in place of the depicted example. For example, while the depicted bogie structure 204 is shown as a single, rigid piece, other implementations may utilize bogie structures 204 that include multiple components or that incorporate some amount of articulation that allows the angle formed between the bogie structure 204 arms to change, e.g., to provide for vertical wheel travel or to raise or lower the center of gravity of the apparatus.

As can be seen in FIG. 3, two wheels 212 may be rotatably connected with each bogie 202. For example, each bogie may have a first axle 208 and a second axle 210. The first axle may be a steerable axle and may be connected with an upright 218 that may be caused to pivot about a steering axis through actuation of a corresponding steering actuator 220. The opposing bogie 202 may have a similar configuration with a counterpart upright 218 and steering actuator 220. It will also be understood that while the depicted implementation does not include such features, some vehicles according to the present disclosure may be configured such that all four wheels are steerable, e.g., the two bogies 202 may be equipped with uprights 218 and steering actuators 220 on both ends thereof, thereby allowing all four wheels to be steered.

The wheels 212 that are rotatably connected with each bogie 202 may each be rotatably connected with that bogie 202 by way of the first axle 208 and the second axle 210 thereof. In the depicted implementation, the first axle 208 and the second axle 210 are both fixed with respect to the upright 218 and the bogie structure 204, respectively, and the wheels 212 each contain a drive motor 216 that may be actuated to cause that wheel 212 to rotate about a corresponding wheel axis 214 relative to the bogies 202. Such drive motors may, for example, be hub motors. In other implementations, one or both of the first axle 208 and the second axle 210 may be rotatable about the corresponding wheel axis 214 relative to the bogies, and the drive motors 216 therefore may instead be located within the bogie structures 202.

The differential mechanism 232 that is depicted is an active differential mechanism that is coupled with a differential actuator 242 by way of a differential worm gear 244 that drives a differential worm pinion gear 246. The differential worm pinion gear 246 is rotatably coupled, in this case by a slip mechanism (discussed later below), with the differential mechanism 232. In some implementations, other types of differential actuators 242 may be used, e.g., an electric motor, such as a stepper motor or a brushless direct-current (BLDC) motor, that may be directly coupled to the differential mechanism 232 (without the use of a worm gear, or with the use of a back-drivable gear), a linear actuator that may actuate a crank that is rotatably coupled with a gear in the differential mechanism so as to cause it to rotate, etc. It will be understood that in some implementations, a passive differential mechanism may be used. In such implementations, the differential actuator 242 may be omitted and the side gears and pinion gear of the differential mechanism (discussed further below) may not be actively driven at all.

The chassis 228 that is shown is a simplified representation; in actual practice, the chassis 228 may be much larger or attached to a much larger structure, e.g., a vehicle body containing a power source (such as a battery), the controller, various sensors used for navigation, one or more cargo compartments, etc.

Figure 4:
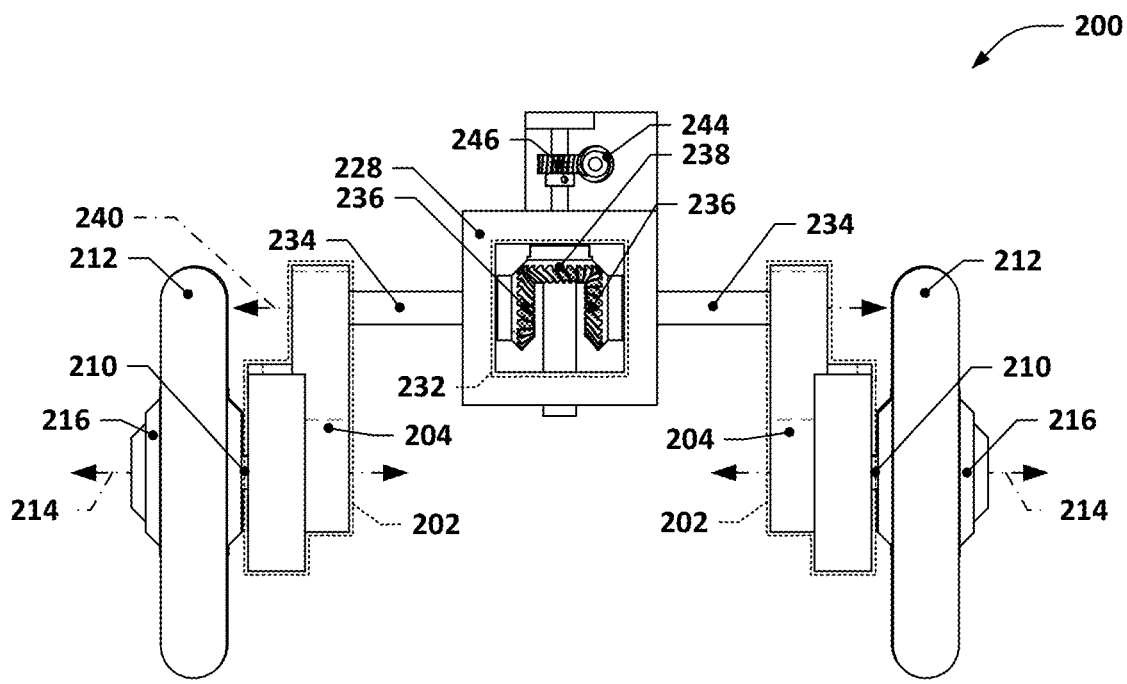
FIGS. 4 and 5 show front and side views of the example apparatus of FIGS. 2 and 3.
Figure 5:
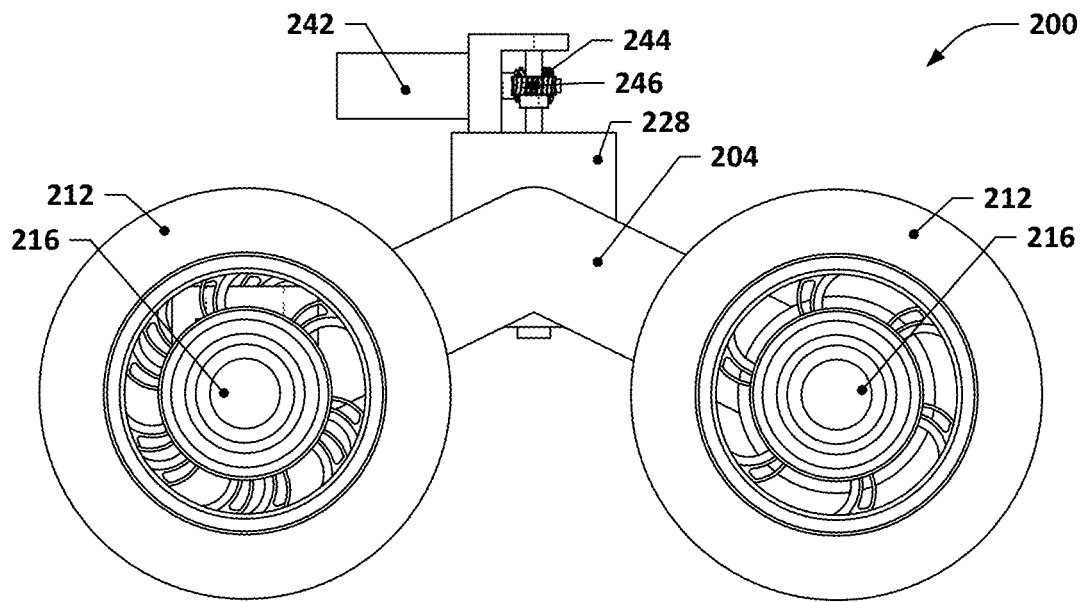

FIGS. 4 and 5 show front and side views of the apparatus of FIGS. 2 and 3. FIG. 4 shows the differential mechanism 232 in more detail. The depicted differential includes two side gears 236 that are each fixed with respect to a corresponding one of the rotatable parts 234. A pinion gear 238 is rotatably mounted with respect to the chassis 228 so as to mesh with both side gears 236; when any of the two side gears 236 and the pinion gear 238 is caused to rotate relative to the chassis, the other two remaining gears will also rotate, thereby causing the two rotatable parts 234 to rotate in opposite directions. The side gears 236 and the pinion gear 238 may, as shown, be bevel gears, although other types of gearing that provide equivalent movement may be used instead if desired.

FIG. 5 shows the apparatus 200 in a "neutral" position, i.e., with both bogies 202/bogie structures 204 positioned such that there is no angular displacement between the two bogies 202 (e.g., with the bogie structures aligned so that the wheel axes 214 of the wheels 212 connected with the first axles 208 are coaxial (assuming the steering angle of the steerable wheels is at zero degrees) and so that the wheel axes 214 of the wheels 212 connected with the second axles 208 are coaxial. This configuration generally represents the position of the bogies 202 when the apparatus is resting on level, flat ground. The chassis 228 in this configuration will generally be in a desired orientation, e.g., parallel (or nearly parallel) to the ground.

FIGS. 6 through 8 depict various views of the apparatus 200 with the differential mechanism being actively controlled by the differential actuator 242 so as to cause the bogies 202 to actively counter-rotate. The neutral positions of the bogies 202 are shown by dotted outlines 206. Also shown in FIGS. 6 through 8 is a surface 258, e.g., a street, parking lot, sidewalk, floor, or other nominally flat structure. FIG. 6 also depicts an elevated feature 260, which may be a curb, step, other feature that is elevated with respect to the surface 258.

As is evident from FIGS. 6 through 8, by causing the differential mechanism 232 to actuate so as to introduce a deliberate amount of counter-rotation in the bogies 202, the bogies 202 may be caused to enter a state in which only three of the four wheels 212 are able to remain in contact with the surface 254. The fourth wheel 212 is caused to be raised up off of the surface 258.

It will be apparent that the center of gravity of such an apparatus, as well as the slope of the surface 258 on which the apparatus rests when approaching the elevated feature 260, may affect which wheel 212 lifts up off of the surface 258—for example, if the elevated feature 260 is at the bottom of a significant down slope, i.e., the surface 258 slopes down towards the elevated feature 260, the wheel 212 that is lifted off of the surface 258 when the bogies are differentially actuated may actually be the wheel that is furthest from the elevated feature 260, thereby preventing the apparatus from mounting the elevated feature. However, in most practical use cases, the surface 258 may generally be close enough to horizontal that such issues do not develop. For example, an apparatus such as is shown in FIG. 1 may be able to operate on inclines of as much as 20° during normal rolling movement. However, the added tilt of the apparatus that may occur during elevated feature mounting by the apparatus may cause the apparatus to, if elevated feature mounting is attempted at the extreme limit of the normal operational incline range, either tip over or be unable to lift the correct wheel in order to attempt a mounting operation. However, the apparatus will still be able to mount elevated features from surfaces that are in lower incline ranges and may be able to mount an elevated feature, e.g., a curb, from a surface that is, for example, at $\pm{\sim}10°$ from horizontal. This discussion is provided simply as an example and is not intended to be viewed as limiting the disclosed bogie-equipped systems discussed herein to the particular performance characteristics discussed above.

FIGS. 9 through 17 depict views of an apparatus equipped with twin bogies, similar to that discussed above with respect to FIGS. 2 through 8, during various stages of mounting an elevated feature, e.g., a curb.

In FIG. 9, the apparatus has been caused, e.g., by a controller, to approach an elevated feature (a curb). The apparatus 900 has a chassis 928 that incorporates an active differential as discussed above. The controller of the apparatus has caused the apparatus to approach the elevated feature 960 such that the fore-aft centerline of the chassis 928 is at an oblique angle to the elevated feature 960, e.g., at an oblique angle to the edge of the curb. The angle may generally be selected so as to be at least large enough that once the wheel 912 that is closest to the elevated feature 960 is caused to be raised up by the active differential, the apparatus 900 may be caused by the controller thereof to move closer to the elevated feature 960 such that the raised wheel 912 is able to be placed (or at least partially placed) over the elevated feature 960 before the next-closest wheel to the elevated feature 960 contacts the elevated feature 960. Ideally, the angle may be such that the center of the raised wheel 912 is able to be moved over the elevated feature 960 before the other wheel 912 associated with that same end of the chassis contacts the elevated feature 960. For a vehicle having proportions similar to that shown, such an angle may be selected to be approximately within 15° to 40° of an axis that is parallel to the surface 958 and nominally perpendicular to the elevated feature 960 (curb). However, such an approach angle may change depending on the particular design of the apparatus. For example, an apparatus with a larger track (transverse spacing between wheels 912) may be able to accommodate a much larger angular range for the approach angle.

It will be understood that the apparatus 900 may be caused to approach the elevated feature 960 such that either the left wheel 912 or the right wheel 912 associated with a first end 930 of the apparatus, e.g., the front end (although in some implementations, the first end may be the back end of the apparatus), is the closest wheel 912 to the elevated feature. The bogie that supports the wheel 912 that is closest to the elevated feature may be referred to herein as the "leading bogie," while the other bogie may be referred to as the "trailing bogie." It will be understood that the leading and trailing bogies may be selected to be different bogies by the controller depending on what approach angle is adopted by the apparatus when approaching the elevated feature 960. Generally speaking, the controller may be caused to select one of the two bogies to be the leading bogie and the other of the two bogies to be the trailing bogie based on which bogie has (or will have) a wheel 912 that is closest to the elevated feature 960 once the apparatus is positioned in front of the elevated feature 960. It will also be understood that each bogie may have a "leading" wheel and a "trailing wheel"; the leading wheel of each bogie is the wheel of that bogie that will be the first of the two wheels of that bogie that mount the elevated feature, while the trailing wheel of each bogie is the wheel of that bogie that is the last of the two wheels of that bogie that mount the elevated feature.

In FIG. 10, the differential actuator has been caused by the controller to actuate so as to cause the leading bogie to rotate such that the wheel 912 associated with the first end 930 that is closest to the elevated feature 960 (the left front wheel in this example) is caused to move closer to the chassis 928 and such that the trailing bogie is caused to rotate in the opposite direction such that the other wheel 912 associated with the first end moves away from the chassis 928. This causes the left front wheel to raise up off the surface 958, leaving the apparatus solely supported by the right front wheel 912 and the two rear wheels 912. The raised wheel 912 has been caused to be raised high enough that the underside of the raised wheel 912 is higher than the upper edge of the elevated feature 960. However, in some instances, the raised wheel may be at a somewhat lower elevation such that the lowest part of the raised wheel 912 is lower than the upper edge of the elevated feature—the raised wheel may, in at least some such cases, still be high enough for the apparatus to eventually mount the elevated feature 960.

Figure 11:
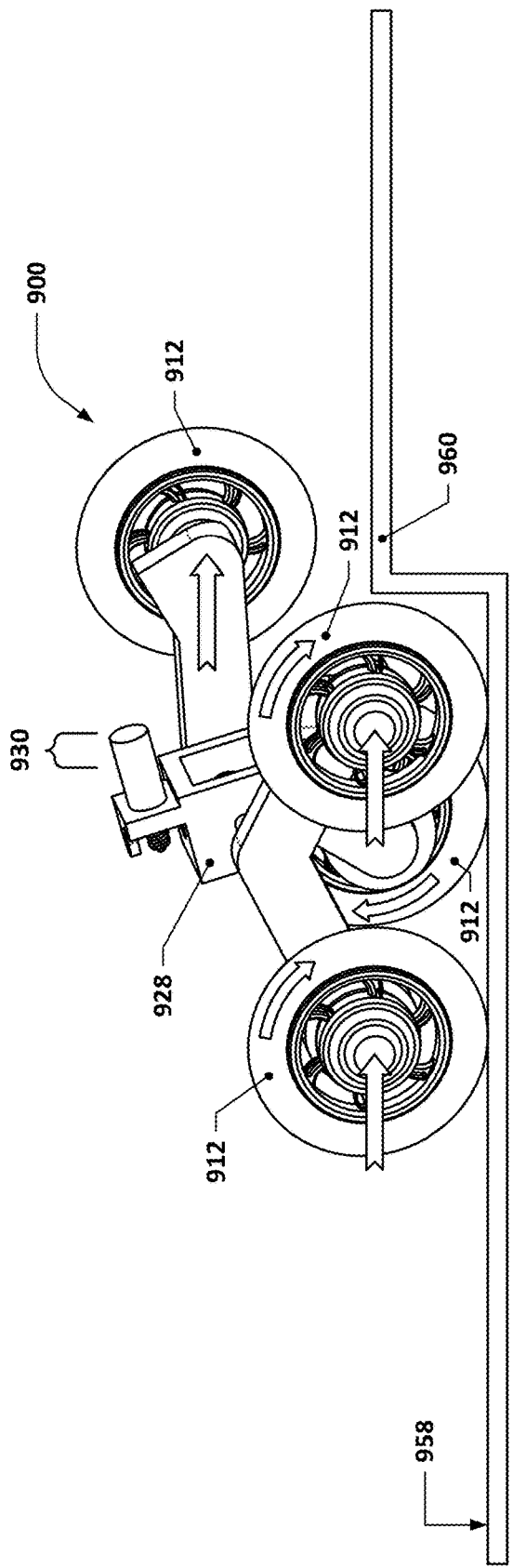

In FIG. 11, the controller has caused the apparatus 900 to move closer to the elevated feature 960. In doing so, the raised wheel 912 of the leading bogie is caused to advance onto or over the elevated feature 960. The apparatus may, for example, be caused to move towards the elevated feature 660 until the opposing wheel 912 on the trailing bogie (or both the opposing wheel 912 on the trailing bogie and the trailing wheel on the leading bogie) contacts or becomes proximate to the side of the elevated feature 960, as shown in FIG. 11.

Figure 12:
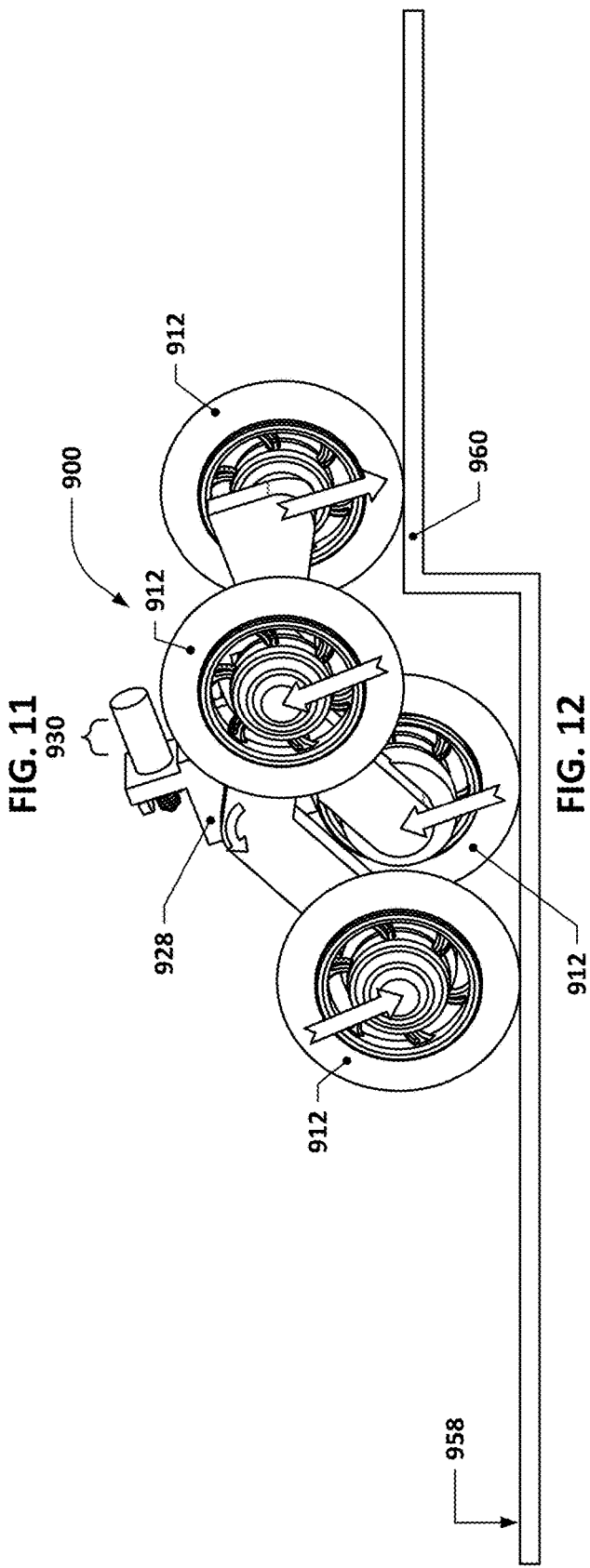

In FIG. 12, the controller has caused the bogies to be actuated in the reverse direction, e.g., so as to cause the left front wheel 912 to move away from the chassis 928 (and towards the elevated feature 960) and the right front wheel 912 to move towards the chassis 928. In some cases, the actuation of the differential shown in FIG. 12 may be performed while the right front wheel 912 is being actively pushed into contact with the elevated feature 960 by the drive motors of the wheels, thereby causing the right front wheel to "drive up" the side of the elevated feature 960 (assisted by the actuation of the differential by the differential actuator).

In FIG. 13, the controller has caused the apparatus 900 to move even closer to the elevated feature 960. In doing so, the raised leading wheel 912 of the trailing bogie is caused to advance onto or over the elevated feature 960. The apparatus may, for example, be caused to move towards the elevated feature 660 until the trailing wheel 912 on the leading bogie contacts or becomes proximate to the side of the elevated feature 960, as shown in FIG. 13.

In FIG. 14, the controller has caused the bogies to be further actuated in the reverse direction, e.g., so as to cause the left front wheel 912 to move further away from the chassis 928 (and towards the elevated feature 960) and the right front wheel 912 to move more towards the chassis 928, thereby causing the trailing wheel 912 on the leading bogie to rise up off the surface 958 to an elevated position in preparation for mounting the elevated feature 960 while the two leading wheels 912 and the trailing wheel 912 of the trailing bogie support the apparatus 900.

In instances in which the trailing wheel 912 of the leading bogie and the leading wheel 912 of the trailing bogie both contact the elevated feature 960 at the same time, the apparatus may be caused to drive into the elevated feature 960 while actuating the differential so as to perform both rotations of the bogies shown in FIGS. 12 and 14 in a generally continuous fashion, thereby causing both the trailing wheel 912 of the leading bogie and the leading wheel 912 of the trailing bogie to simultaneously climb up the side of the elevated feature 960 and both generally mount the elevated feature simultaneously.

In FIG. 15, the controller has again caused the apparatus 900 to move even closer to the elevated feature 960. In doing so, the raised trailing wheel 912 of the leading bogie is caused to advance onto or over the elevated feature 960. The apparatus may, for example, be caused to move towards the elevated feature 660 until the trailing wheel 912 on the trailing bogie contacts or becomes proximate to the side of the elevated feature 960, as shown in FIG. 15.

In FIG. 16, the controller has caused the bogies to be actuated in the original direction (e.g., similar to the rotation shown in FIG. 10), e.g., so as to cause the left front wheel 912 to move closer to the chassis 928 and the right front wheel 912 to move away from the chassis 928, thereby causing the trailing wheel 912 on the trailing bogie to rise up off the surface 958 to an elevated position in preparation for mounting the elevated feature 960 while the two leading wheels 912 and the trailing wheel 912 of the leading bogie support the apparatus 900.

Figure 17:
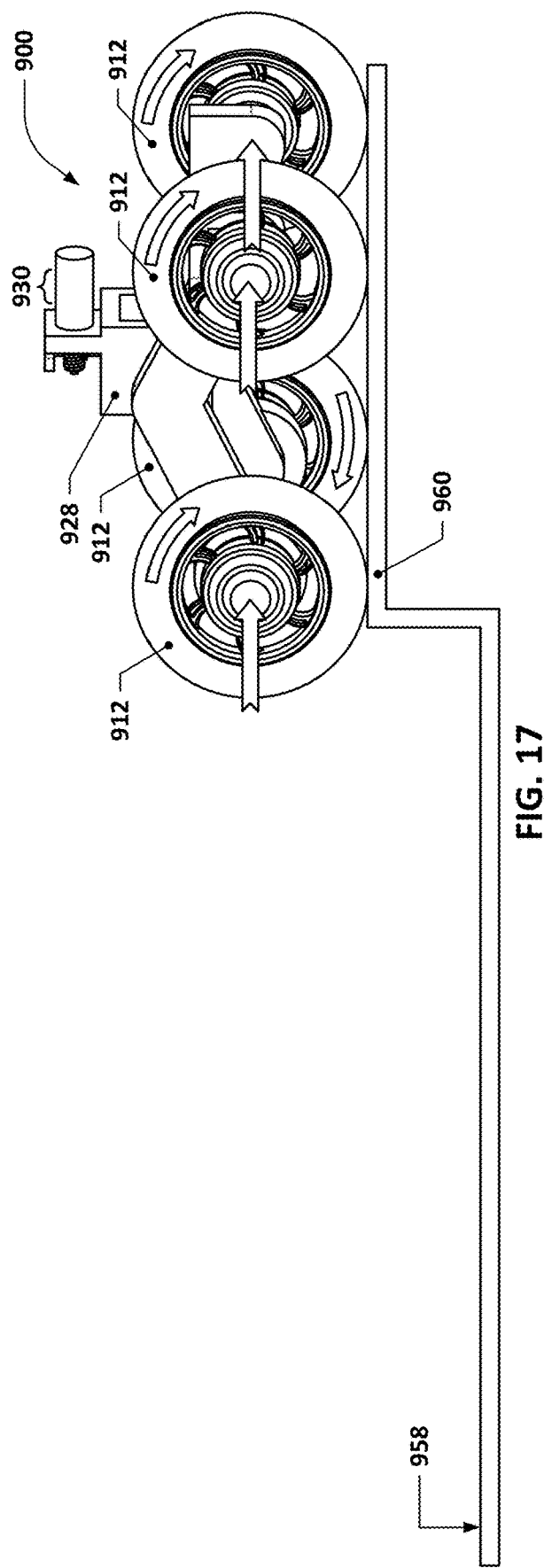

In FIG. 17, the controller has again caused the apparatus 900 to move fully onto the elevated feature 960. Having successfully mounted the elevated feature 960, the apparatus may now proceed to continue on to its destination.

In implementations that feature an actively controllable differential for the bogies, it may be desirable to allow for some amount of "passively driven" bogie movement to occur without necessarily causing deliberate contra-rotation of the bogies. For example, a passive differential mechanism may be used in bogie-equipped apparatuses to allow such apparatuses to drive more smoothly across bumpy ground (e.g., gravel, cracks, pavement seams), small vertical features (such as where a sloping curb cut may not join with the street in a perfectly flush manner), etc. The passive counter-rotation of the bogies acts to cause the wheels of the apparatus to remain more fully engaged with the ground even when one of the wheels is, for example, kicked up due to running over a pebble or other small obstacle. The differential mechanism thus acts as a sort of mechanical smoothing filter that mitigates the effects that may be caused when the apparatus traverses small discontinuities or surface imperfections that might otherwise cause the apparatus to bounce or skip in a manner that may make the apparatus more difficult to control (or which may be more harmful to contents of the apparatus being transported).

Apparatuses with actively controllable differentials may be designed so as to still provide the features of a passive differential mechanism, thereby allowing the apparatus to enjoy the benefits of a passive differential mechanism while also enjoying the benefits of an active differential mechanism, e.g., such as being able to surmount elevated features such as curbs.

Two example systems or approaches for providing hybrid active/passive differential systems are discussed below—one is a passive mechanical system and the other uses an algorithm to control the differential actuator so as to cause the differential mechanism to behave in a manner similar to a passive differential mechanism.

Figure 18:
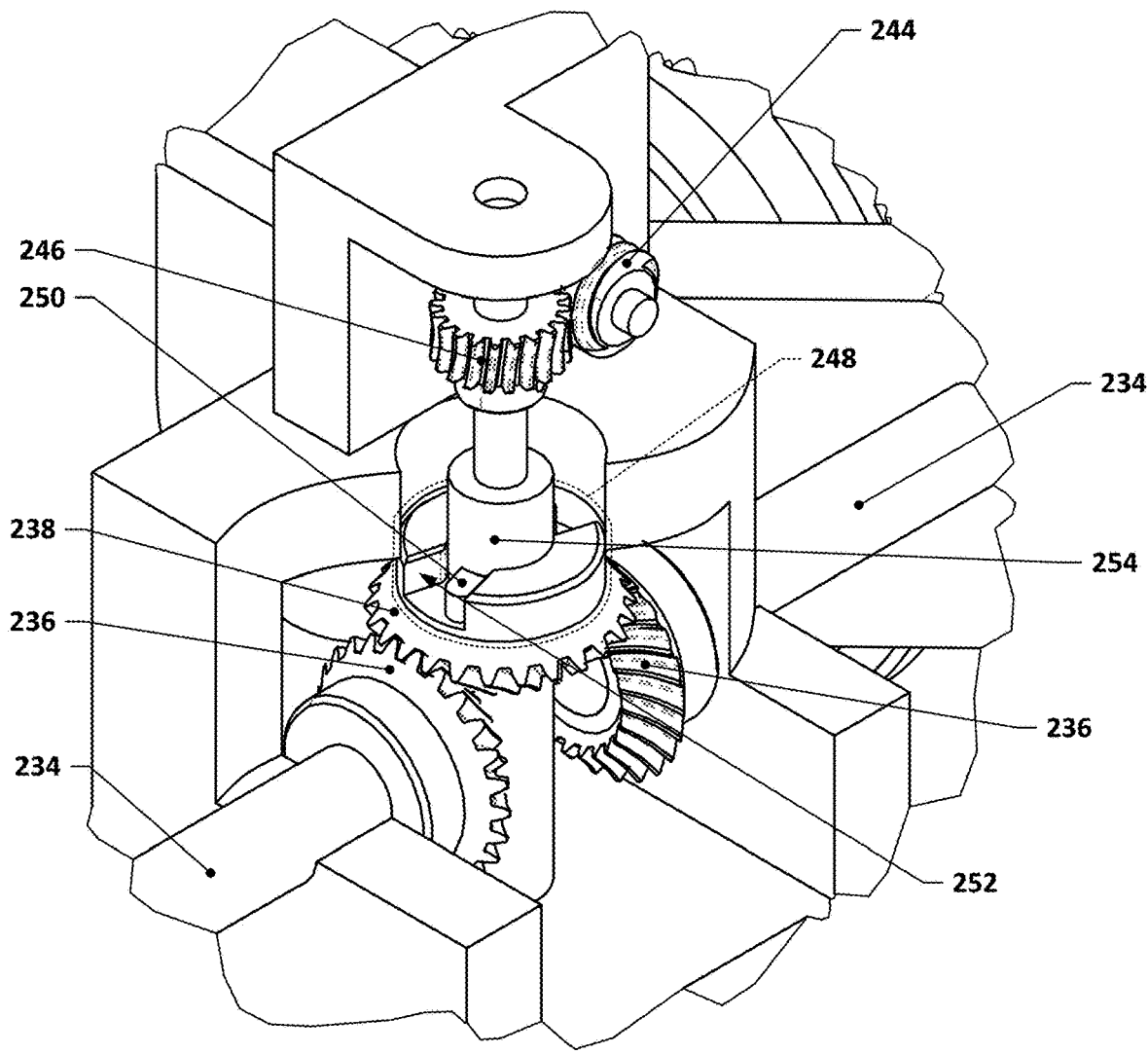
FIG. 18 depicts a detail view of an example differential mechanism and an example slip mechanism.

The passive mechanical system that may be used to enable such a hybrid approach may be implemented through the use of a slip mechanism, which was briefly mentioned earlier. FIG. 18 depicts a detail view of the portion of the apparatus 200 located within the dashed circle in FIG. 2 but with portions of the chassis 228 cut away to reveal various internal features not visible in FIG. 2. More clearly visible in FIG. 18 is the slip mechanism 248. The slip mechanism 248 includes a positive stop 250 that protrudes from a shaft 254 that is driven by the differential actuator 242. The pinion gear 238, in this case, includes a cylindrical body that encircles the shaft 254 directly behind the gear teeth. The cylindrical body has a missing arcuate sector that is large enough that the positive stop 250 is able to rotate for some distance before it encounters either radial wall of the arcuate sector, which provide stop surfaces 252 (only one is visible, but another exists on the opposite side of the missing arcuate sector).

Figure 19:
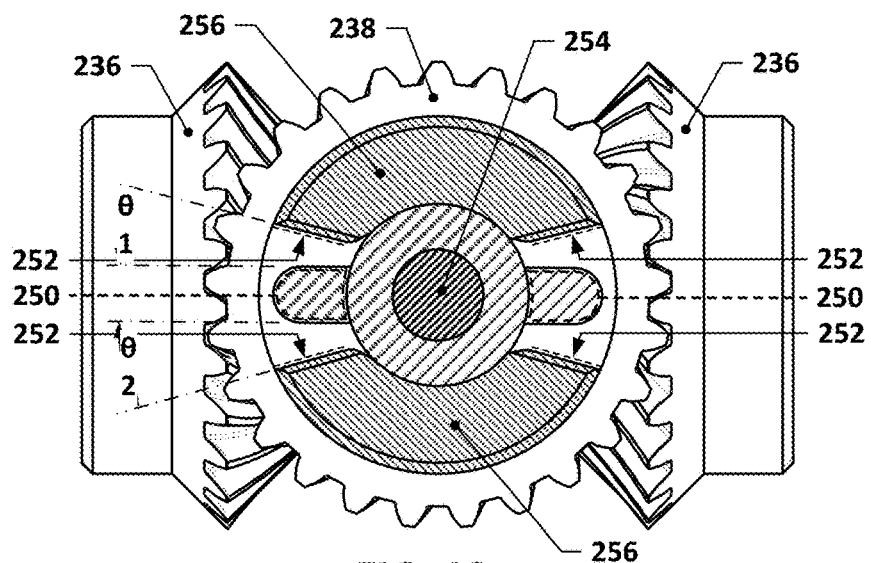
FIG. 19 depicts a top view of the example differential mechanism and example slip mechanism of FIG. 18.

FIG. 19 depicts a top view of the differential mechanism of FIG. 18 with only the pinion gear 238, side gears 236, stop structure 250, and the shaft 254 shown. As can be seen, there are actually two diametrically opposed stop structures 250 shown—the second stop structure 250 is a duplicate of the first, although this may not necessarily always be the case. The pinion gear 238 has raised stop features 256 that each extend around the shaft 254. The raised stop features 256 are both angular sector shapes that extend through approximately ~150° of arc in this case. This allows, in this particular case, for approximately a maximum of 30° of rotation $(\theta_1+\theta_2)$ to occur between the shaft 254 and the pinion gear 238 before the stop structures 250 come into contact with any of the stop surfaces 252.

When an actuated differential such as the one shown in FIG. 19 is used in a bogie-equipped vehicle such as those discussed herein, the differential actuator may be caused to rotate such that each positive stop 250 is located midway between the two stop surfaces 252 when the bogies are in the "neutral" position. This allows for a maximum amount of travel to occur in both rotational directions before the stop structure 250 engages with either of the stop surfaces 252. Thus, the differential mechanism shown will act as a passive differential mechanism up until the point where the positive stop(s) 250 engage with the stop surface(s) 252. However, the range of motion permitted by the slip mechanism may be quite large, thereby allowing for any realistic amount of passive contra-rotation of the bogies to occur during normal terrain traversal.

When it is desired to engage in abnormal terrain traversal, e.g., such as requiring the apparatus to mount an elevated feature that it cannot simply or safely drive over, the differential actuator may be actuated so as to cause the slip mechanism to travel to the limit of its "slip range" such that the positive stop(s) engage with the stop surface(s). Further actuation of the differential actuator will then cause the differential mechanism to actively cause the two bogies to contra-rotate relative to each other (and the chassis), thereby allowing for movements such as those discussed above with respect to FIGS. 9 through 17.

It will be understood that other types of slip mechanisms 248 may be used as well, including ones in which the features discussed above are reversed (the positive stop(s) 250 are fixed with respect to the pinion gear 238 and the stop surfaces 252 are fixed with respect to the shaft 254), ones in which the positive stops 250 extend in a direction parallel to the rotational axis of the shaft 254 (instead of radially with respect to the shaft 254).

It will also be acknowledged that while the slip mechanism 248 and the differential actuator 242 are shown as being configured to provide motive input to the pinion gear 238, other configurations may be arranged so as to provide a motive input to one of the side gears 236. As a first one of the side gears 236, the pinion gear 238, and the other one of the side gears 236 are all meshed in series to provide an intermeshed gear train that causes all of the gears to turn in unison, the motive input that is used to actuate the differential may be applied to any of the side gears 236 or the pinion gear 238 (or to any of the components that are fixed with respect to one of those gears) to equal effect. Similarly, the slip mechanism 248, if used, may be implemented so as to allow such motive input to be communicated to whatever part is to be rotationally driven while still allowing the driven part to remain stationary for some amount of motive input.

The slip mechanism shown in FIGS. 18 and 19 is configured such that it is impossible to back-drive the differential actuator through rotation of the bogies relative to the chassis. The use of a worm gear on the output of the differential actuator prevents rotation of the pinion gear 236 from being transmitted to the differential actuator. Such a mechanism, however, may be very well-suited to use in an active differential since worm gears provide a very high torque multiplier effect that may allow a relatively small differential actuator to cause the bogies to contra-rotate (which will also involve lifting the weight of the apparatus somewhat).

Figure 20:
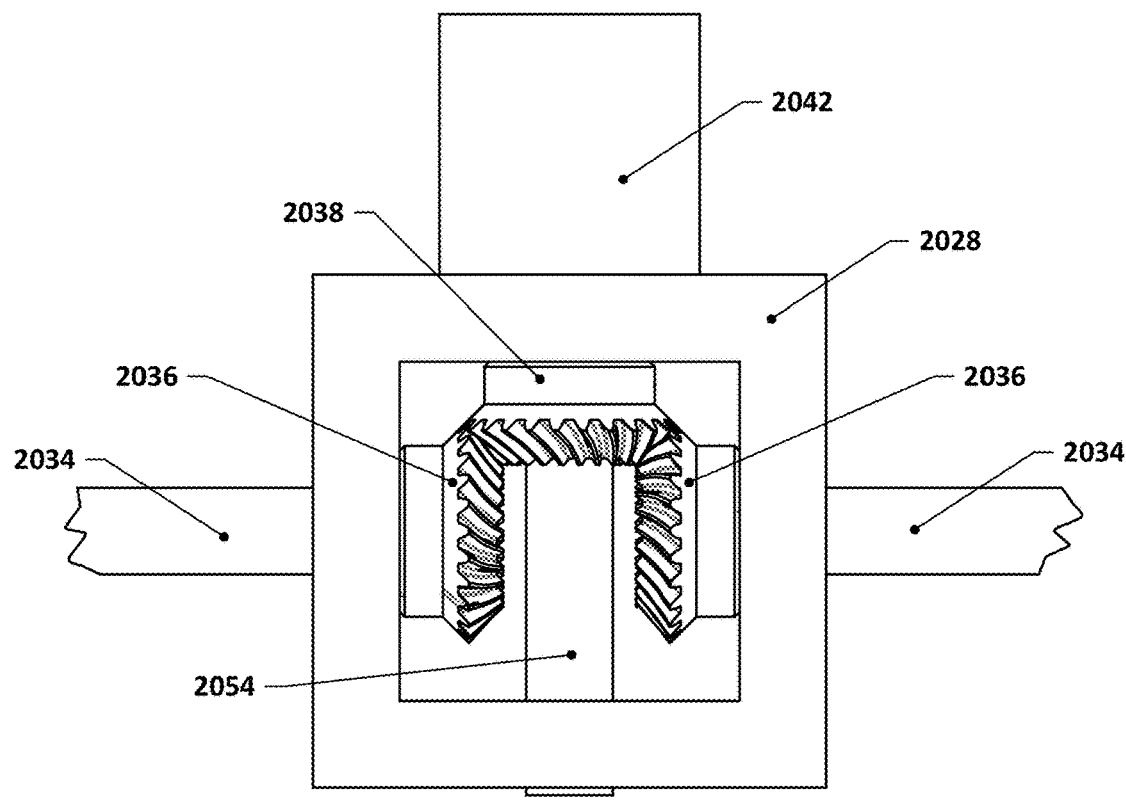
FIG. 20 depicts an alternate differential actuator arrangement.

FIG. 20 depicts an alternate differential actuator arrangement in which a differential actuator 2042 has an output shaft 2054 that is fixed with respect to a pinion gear 2038 that drives (or is driven by) two side gears 2036. Each side gear is fixed with respect to a corresponding rotatable part 2034. The rotatable parts 2034 and the shaft 2054 may all be rotatable with respect to a chassis 2028. The depicted differential mechanism of FIG. 20 is back-drivable, i.e., if sufficient torque is applied to either rotatable part 2034 relative to the chassis 2028, the torqued rotatable part 2034 will rotate and cause the side gears 2036 and the meshed pinion gear 2038 to rotate, thus causing the differential actuator to be back-driven (caused to move through the application of external torque as opposed to through the application of electrical power).

Back-drivable differential mechanisms such as that shown in FIG. 20 may be used to provide a virtual slip mechanism that uses a motor control algorithm to provide performance that simulates a passive differential mechanism despite the pinion gear 2038 being fixedly mounted to the output shaft of the differential actuator (which may be an electric motor, e.g., a stepper motor, BLDC motor, or servo motor).

For example, a controller of an apparatus that features a differential mechanism such as that shown in FIG. 20 may be configured to cause the differential mechanism to operate in a mode in which the differential mechanism is to operate in a manner similar to a passive differential mechanism. When operating in such a mode, the controller may monitor information received from one or more sensors, e.g., rotational encoders or other similar sensors, that may provide information on the rotational state of one or both rotatable parts (and thus the bogies) and, based on such information, cause the differential actuator to be placed in one of at least two states.

In a first state, a sinusoidal electrical current is supplied to the differential actuator at an amplitude that is just slightly below the current level needed to actually cause the differential actuator to start moving. This current level may be thought of as the "starting current" that is necessary to a) overcome whatever frictional loads may exist in the various rotational interfaces that exist in the differential gear train and the rotatable parts and b) cause the bogies to rotate so as to cause at least some of the load on one of the wheels of the apparatus to be decreased. By supplying a sinusoidal current that has an amplitude just below this current level, the differential mechanism is, in effect, primed so that any small change in torque (in either direction) that is applied to the rotatable parts will cause the differential actuator to move (the sinusoidal application of current ensures that regardless of direction, there will generally always be a half-cycle of the sinusoidal current in which the direction of the torque applied by the differential actuator lines up with the direction of the externally applied torque—when this happens, the differential actuator will start to rotate). Such sinusoidal currents may be applied, for example, at a frequency that is based on the current apparatus speed or a potential maximum speed of the apparatus. For example, a frequency of ~100 Hz or more, or ~400 Hz or more, may be used for apparatuses that are traveling at or have a maximum speed of 3 m/s or less. In many implementations, such sinusoidal currents may have an amplitude that is less than the starting current but within 90% or 95% of the starting current.

In a second state, the current that is caused to be supplied to the differential actuator is changed to a non-sinusoidal, e.g., unidirectional, current that is set to be slightly less than the amount of current needed to keep the differential actuator in motion responsive to the application of a small external torque to one of the rotatable parts. This may, for example, be a current level that changes depending on the degree to which the bogies have been actuated. The direction of the current may also be selected so as to cause motive torque from the differential actuator to be applied to the rotatable parts in the same direction as the direction of rotation that the external torque is urging.

In the first state, the output of the differential actuator is thus caused to generally remain (barely) stationary unless an external torque is delivered to it, e.g., by one of the bogies being jostled due to encountering an obstacle. In the second state, the output of the differential actuator is caused to apply torque to the rotatable parts that is just below the amount of torque needed to keep or maintain the rotatable parts in motion. The amount by which the current that is supplied to the differential actuator is caused to undershoot the different target current ceilings (e.g., the "starting" current and the "in-motion" current) may depend on various factors, although in some implementations, setting the amplitude or magnitude of the current to be less than 100% but greater than or equal to 90% or 95% of the relevant target current ceiling may provide such an effect. Thus, in both states, the differential actuator is caused to remain in a state where it provides almost no resistance to external torques applied to the differential, e.g., from rotation of the bogies relative to the chassis. This, in effect, causes the differential mechanism to generally act as if the differential actuator were not present when the passive differential mode is engaged.

In practice, when the controller is operating the differential actuator in passive differential mode, the controller may cause the differential actuator to switch between the first state and the second state responsive to various conditions.

For example, in some implementations, the controller may initially place the differential actuator in the first state, e.g., by causing a sinusoidal current to be provided to the differential actuator. The controller may then monitor the information regarding the rotational state of the rotatable parts that are connected with the differential mechanism to determine by how much the rotatable parts have rotated from their rotational positions when in the neutral position. When the rotatable parts (and thus the bogies connected therewith) have rotated from the neutral position by an amount that exceeds a first threshold amount (in either direction from the neutral position), then the controller may place the differential actuator in the second state, e.g., by causing a non-sinusoidal current to be provided to the differential actuator so as to cause rotation of the differential actuator in the same direction as the rotation of the bogies is causing the differential actuator to rotate in. The controller may further monitor the rotational displacement of the rotatable parts from their neutral positions and may in some implementations, for example, cause the differential actuator to re-enter the first state when the measured rotational displacements show that the rotatable parts are engaged in motion that would return them to the neutral position. For example, when the bogies are caused to rotate by external forces applied to the wheels by imperfections in the surface on which the apparatus is driving, the bogies may be first caused to rotate away from the neutral position in opposite directions. However, at some point the external forces may be removed (e.g., after the apparatus has driven over the imperfections), thereby removing the forces that keep the bogies in the angularly displaced state. The bogies may then start to return to the neutral state due to gravitational loading—when this occurs, the rotational displacements of the rotatable parts relative to their neutral position orientations will decrease, which will be observable from the information regarding the rotational state. During the rotational motion of the bogies that causes them to return to their neutral state, the controller may cause the differential actuator to enter the first state. Alternatively, the controller may cause the differential actuator to remain in the second state during such restorative motion, but the direction in which the controller causes the differential actuator to actuate may be reversed so as to somewhat urge the bogies to return to their neutral positions.

In another implementation, the controller may use the information regarding the rotational state of the rotatable parts to determine a rotational velocity or rate of the rotatable parts. When the rotational velocity or rate of the rotatable parts is below some threshold amount, then the controller may cause the differential actuator to operate in the first state. However, when the rotational velocity or rate of the rotatable parts is above the threshold amount, then the controller may cause the differential actuator to operate in the second state.

In view of the above discussion, it will be understood that actively controlled differential mechanisms, if used, may be equipped with either mechanical slip mechanisms or software-based electromechanical slip mechanisms (in the form of a back-drivable motor that is controlled as discussed above). Either slip mechanism may be used to provide an actively controllable differential that may be switched between a mode in which the differential mechanism acts as a "passive" differential mechanism (responsive only to inputs received by way of rotations of the bogies caused by externally applied forces) and a mode in which the differential mechanism is an "active" system that can be actuated so as to deliberately cause a certain amount of contra-rotation in the bogies. If an actively controlled differential mechanism is used that utilizes the control scheme discussed above to cause the differential mechanism to behave as a "passive differential mechanism," the current that is supplied to the differential actuator when the differential mechanism is to be operated as an "active differential mechanism" may be greater than the starting current and sufficient to overcome the torque exerted on the bogies, for example, due to the weight and center of gravity of the apparatus.

The discussion above has largely focused on differential mechanisms and control schemes therefor for bogie-equipped apparatuses. However, as discussed above, bogie-equipped apparatuses may also feature independently controllable steering actuators that may be used to provide various steering enhancements that are not possible with traditional steering systems (in which left and right steerable wheels have steering angles controlled by a single steering input).

As discussed earlier with respect to FIG. 3, some bogie-equipped apparatuses may have steering systems in which a linear actuator (such as steering actuator 220 in FIG. 3) is controlled so as to extend or retract from a neutral position so as to push or pull on a crank arm is connected with (or part of) an upright (such as upright 218), thereby causing the upright, which may be pivotally mounted, to rotate about a steering axis. Each upright may have a first axle that is connected therewith such that when the upright is rotated, the first axle connected therewith rotates as well. Such an arrangement is somewhat similar to that used in a traditional vehicle steering system, e.g., where left-right linear translation of a steering rack is transferred to the crank arms of uprights on both sides of the vehicle so as to cause similar rotation of the uprights. However, in the traditional steering system, the rotation of both uprights is linked to the common movement of the steering rack. In the system discussed above, however, each steering actuator may be individually controlled, thereby allowing the steering angles of the steerable wheels to be independently controlled.

Figure 21:
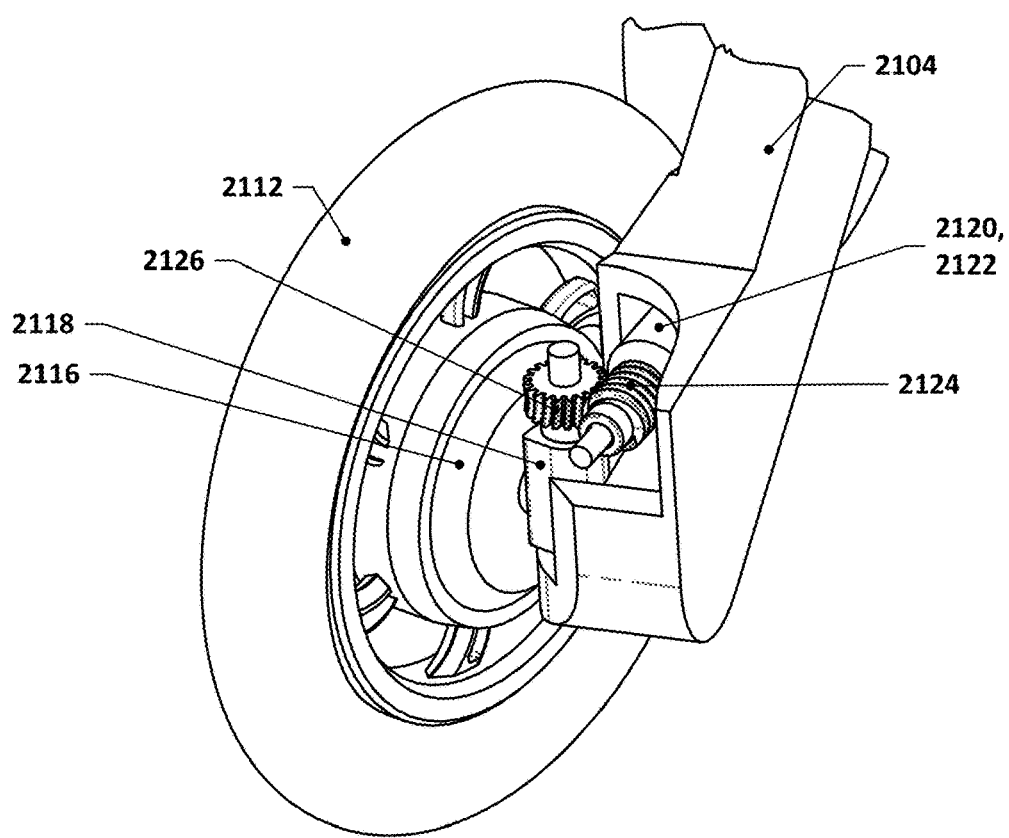
FIG. 21 depicts an example of a worm-gear-driven steering system.

Another example steering actuator system is shown in FIG. 21. In the example of FIG. 21, the steering actuator 2120 includes a steering drive motor 2122 and a steering worm gear 2124 that are housed within a bogie structure 2104. Instead of having a crank arm, the upright 2118 may have a steering pinion gear 2126 that is fixed with respect to the upright 2118. A wheel 2112 may be rotatably coupled to the upright 2118, e.g., by way of a hub motor 2116. The use of a worm gear arrangement in the depicted steering system is somewhat counterintuitive, however, as worm gears are generally not back-drivable and also generally have slower response times due to their low gear ratios. Because of this, the use of a worm gear in a steering mechanism would typically be avoided in vehicles since this could result in the steering angles of the wheels becoming locked in a particular orientation should the steering actuator lose power. In a manned vehicle, this could have catastrophic consequences for the occupant(s) since the vehicle may be unable to steer to avoid an obstacle or another oncoming vehicle. Additionally, the low gear ratio of worm gear drive systems would require electronic control of the worm gear drive that would, in effect, multiply a single turn of the steering wheel into a much larger number of worm gear rotations, e.g., 10 to 20, for example. Any failure of the electronic control that implements this multiplication effect would necessarily render the steering system useless since the driver would be unable to control the steering system. In the vast majority of manned vehicles, the steering mechanism is mechanically coupled to the steering input (steering wheel) such that rotation of the steering wheel directly causes, even if there is no electrical power available, the steering system to actuate—this allows such vehicles to be steered even in the event of complete electrical power failure.

In the context of unmanned autonomous vehicles, however, the use of worm gear-driven steering actuators may present less of a risk since there are no occupants in the vehicle. Moreover, many such vehicles may also generally be much smaller than a manned vehicle and operated at generally lower speeds, e.g., 1 m/s to 3 m/s (e.g., on the order of a pedestrian's walking or running speed), thus presenting a lower risk to other vehicles and/or pedestrians should there be a steering system failure. The use of a worm gear drive in the steering system also allows such autonomous vehicles to use lower-power steering actuators (thus extending battery life) and to implement unique steering system actuation paradigms that may be implemented in order to place such apparatuses in a "park" mode that may be more effective at preventing unintended movement of the apparatus.

Figure 22:
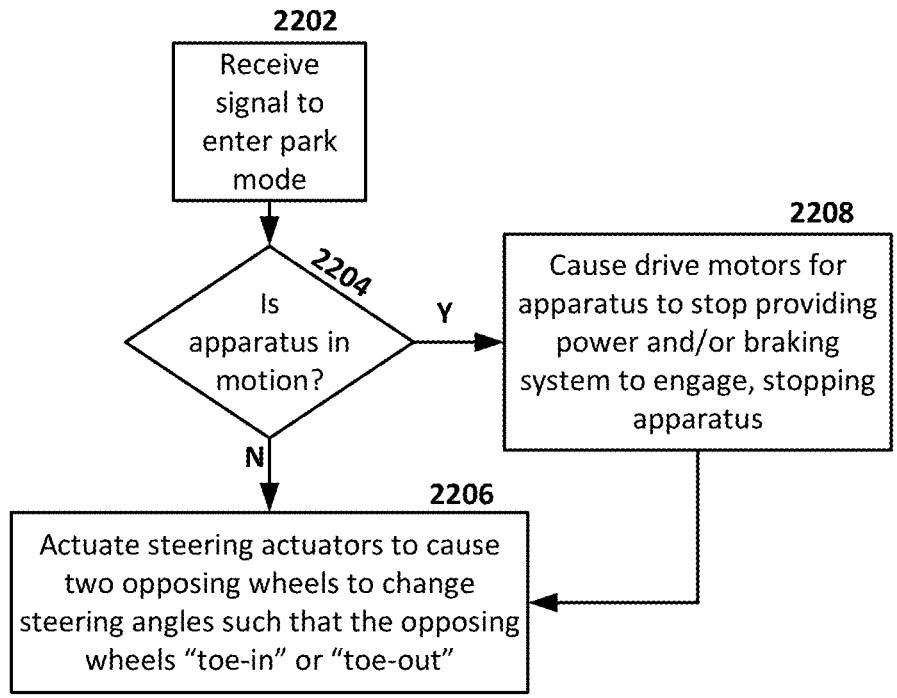
FIG. 22 depicts a flow chart for a technique for entering a park mode.

FIG. 22 depicts a flow chart of a parking technique that may be used, for example, with the worm-gear driven steering system discussed above. In block 2202, a signal may be received by a controller of a vehicle having independently steerable wheels that indicates that the vehicle is to enter a "park" mode. Once such a signal is received, the technique may proceed to block 2204, in which a determination may be made as to whether or not the vehicle (or apparatus) is in motion.

Figure 24:
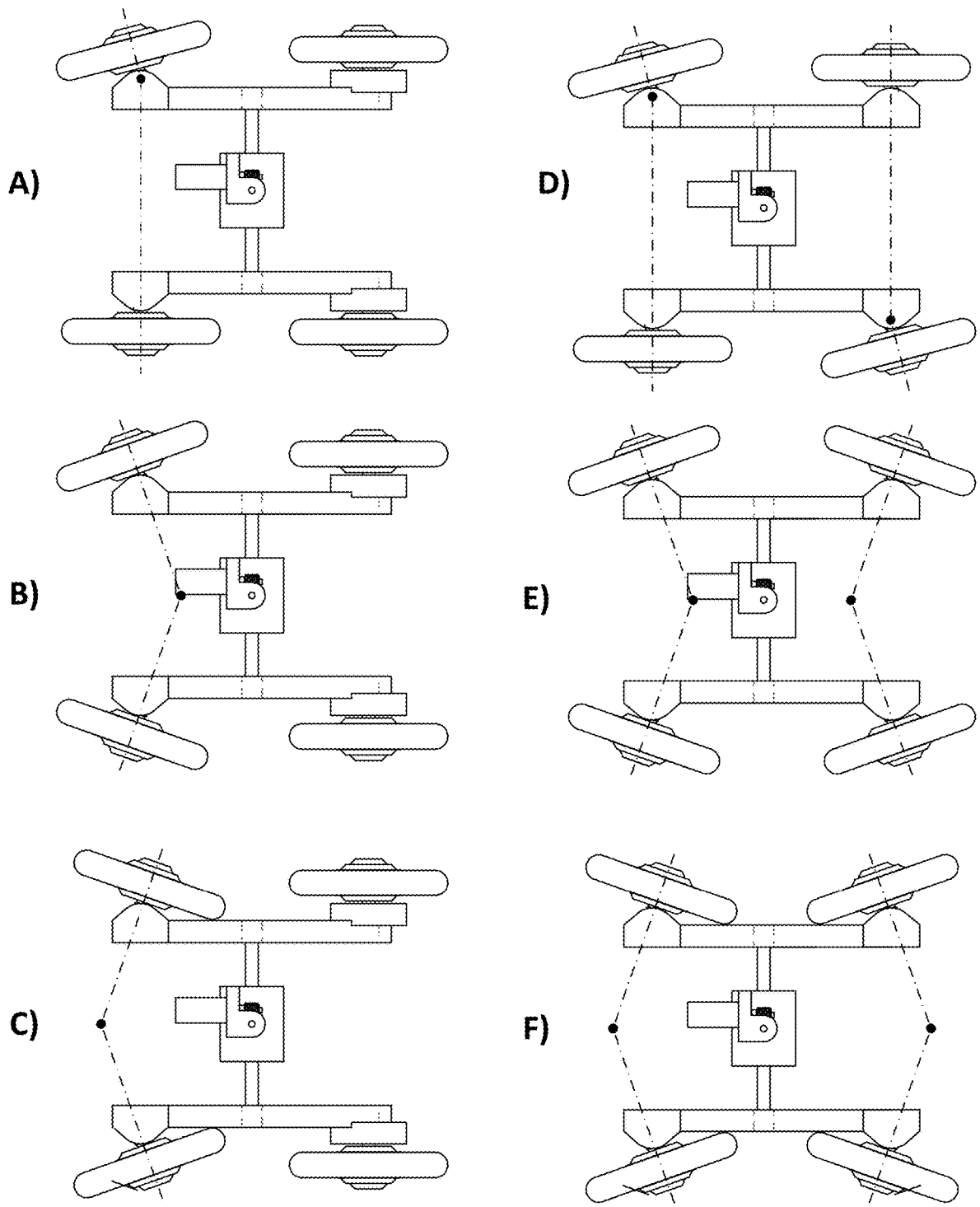
FIG. 24 depicts various steering angles in various parking configurations.

If the apparatus is determined in block 2204 to not be in motion, then the technique may proceed to block 2206, in which the controller may cause the steering actuators to actuate so as to cause two opposing steerable wheels to enter into a "toe-in" or "toe-out" state. The toe-in and toe-out states are actually similar states, but viewed from ends of the apparatus. In either state, at least one of the steerable wheels is steered to a non-zero steering angle such that the rotation axes of the steerable wheels, when viewed from above, cross each other at a location that is inboard of the steerable wheels. For example, one steerable wheel may actually be kept straight (a steering angle of 0°) and the other steerable wheel steered to any non-zero angle (although preferably to a steering angle of at least 5 degrees and more preferably to whatever the maximum steering angle limit is, or close to it, e.g., within 5 degrees of the maximum steering angle possible given the rotational constraints of the steering mechanism). In most cases, however, both opposing steerable wheels may be steered so as to have non-zero steering angles. FIG. 24 shows six examples of different toe-in and toe-out steering configurations—examples (A) through (C) are examples of (A) a toe-in state in which only one steerable wheel is steered to a non-zero steering angle, (B) a toe-in state in which both steerable wheels are steered to non-zero steering angles, and (C) a toe-out state in which both steerable wheels are steered to non-zero steering angles. As can be seen, the black dots located at the intersections of the dash-dot-dash lines in each example show where the rotational axes (represented by the dash-dot-dash lines) of the steerable wheels cross each other when viewed from above. Examples (D) through (F) are similar examples of such steering configurations but implemented in an apparatus that has four-wheel steering. Thus, example (D) features two wheels that have been steered to non-zero steering angles and two wheels that have been kept stationary at 0° steering angle, example (E) features both fore and aft wheels that have been steered so as to be toe-in, and example (F) features both fore and aft wheels that have been steered so as to be toe-out. Other permutations of such steering configurations may be used as well. It will also be appreciated that the steering angles used for each wheel in examples (B), (C), (E), and (F), while shown as being equal in magnitude, may also be different for two or more of the wheels, e.g., 15° for one wheel and 30° for the opposing wheel. As can be seen, the locations where the wheel axles cross one another when viewed from above are, in each depicted example, inboard of the steerable wheels.

If it is determined in block 2204 that the apparatus is in motion, then the technique may instead proceed to block 2208, in which the controller may control the drive motor(s) to stop providing power to one or more of the wheels (if such power is being provided) and/or cause a braking system of the apparatus to engage, thereby causing the apparatus to stop. In some implementations, the drive motors may also serve as the braking system, e.g., power supplied to the drive motors may be switched off and a resistive load may instead be applied across the terminals of the drive motor that previously were used to provide electrical power to the drive motor, thereby turning the drive motor into a generator and causing the kinetic energy of the apparatus to be converted into electrical power that is dissipated through the resistive load. The resistive load may, in some implementations, be provided by way of a battery charging circuit such that such kinetic energy may be at least partially recaptured to help recharge the battery or batteries. Regardless, the controller may cause the apparatus to stop in block 2208 if the apparatus is determined to be in motion in block 2204.

If the above-discussed technique is implemented in an apparatus featuring a worm-gear driven steering system, such as that discussed above with respect to FIG. 21, the worm gear may, in effect, act to lock the wheels in the park configuration, making it impossible to straighten the wheels out unless the controller causes the steering actuator(s) thereof to actuate them out of the toe-in or toe-out configuration. This may be particularly advantageous in the context of an autonomous vehicle, as such a system may be used to park the apparatus and keep it stationary without needing to consume any electrical power to maintain the parked state. For example, there may be no need to continue providing power to the drive motors to keep them locked in a particular state. Additionally, the self-locking nature of a worm-gear-driven steering actuator also allows the parked state to be maintained even when all power to the apparatus is lost. Such a feature may prevent unintended unpowered movement of the apparatus that may present a hazard to pedestrians or property.

Figure 23:
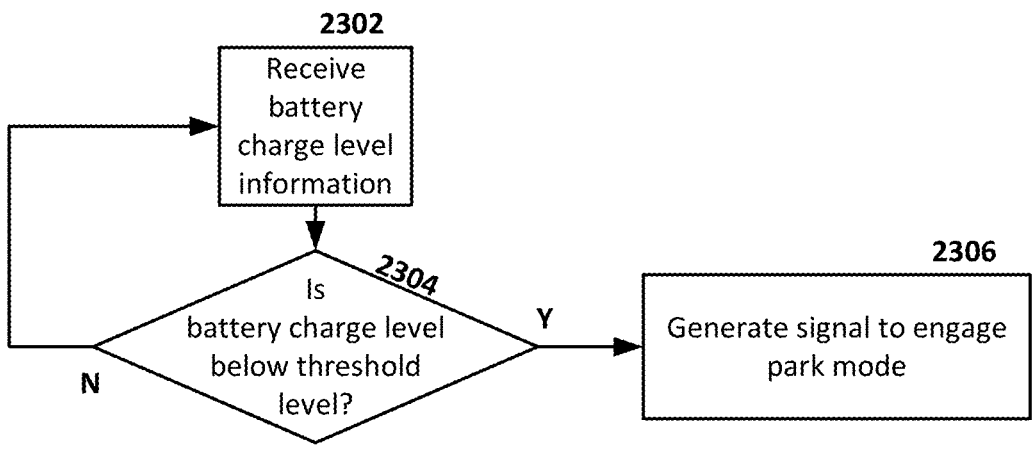
FIG. 23 depicts a flow chart for a technique for parking a vehicle when a battery charge level is low.

FIG. 23 depicts an example flow chart for a technique for engaging parking mode in an apparatus responsive to a low battery event. In block 2302, the controller of such an apparatus may receive battery charge level information (or battery health information—generally any information that may be used by the controller to determine if a loss of power may be imminent). The information that may be received in block 2302 may also or alternatively be any information that may indicate a potential fault state or system or component failure that may present a safety issue if the apparatus continues to attempt to operate in a normal fashion despite the fault state or system failure. For example, information indicative of a battery failure (short circuit, thermal runaway, low charge level, etc.), sensor failure (e.g., indicating a non-responsive sensor, a saturated sensor (one that is at the limit of its sensing capability), a sensor that is reporting values that appear to be erroneous or inaccurate given the context that the apparatus is in, etc.—such can be with respect to tilt sensors, accelerometers, gyroscopic sensors, GPS sensors, lidar sensors, radar sensors, proximity sensors, light sensors, imaging sensors, etc.), motor failure (a motor that does not appear to be responding or responding slower than expected, a motor that is exerting an unexpected amount of torque (either above or below an expected torque range), etc.—such can be with respect to drive motors for the wheels, differential actuator motors, steering motors, etc.), processor or memory failures, software failures, etc. may be used to trigger engagement of a parking mode. In block 2304, a determination may be made as to whether the battery charge level is below a threshold level (or if the information obtained in block 2302 indicates that the apparatus should or should not be entered into a park mode). If not, then the technique may return to block 2302 and another indication of the battery charge level may be obtained. However, if the battery charge level is below the threshold level, then the technique may proceed to block 2306, in which a signal may be generated to engage park mode, e.g., a signal such as is received in block 2202 of FIG. 22. The technique of FIG. 22 may then be implemented to park the apparatus.

The parking technique discussed above may also be practiced with non-worm-gear-driven steering actuation systems, although such implementations may not offer as many advantages as may be obtained with practicing such techniques using worm-gear-driven steering systems. For example, such alternative actuation systems may be back-drivable, making them less able to maintain the parking state when power to the steering actuation system is removed.

The use of independent steering actuation systems for each steerable wheel also permits particular steering techniques to be implemented in bogie-equipped apparatuses. For example, in some implementations featuring steerable wheels with independently controllable steering actuators, such actuators may be controlled differently based on the speed of the vehicle.

Figure 25:
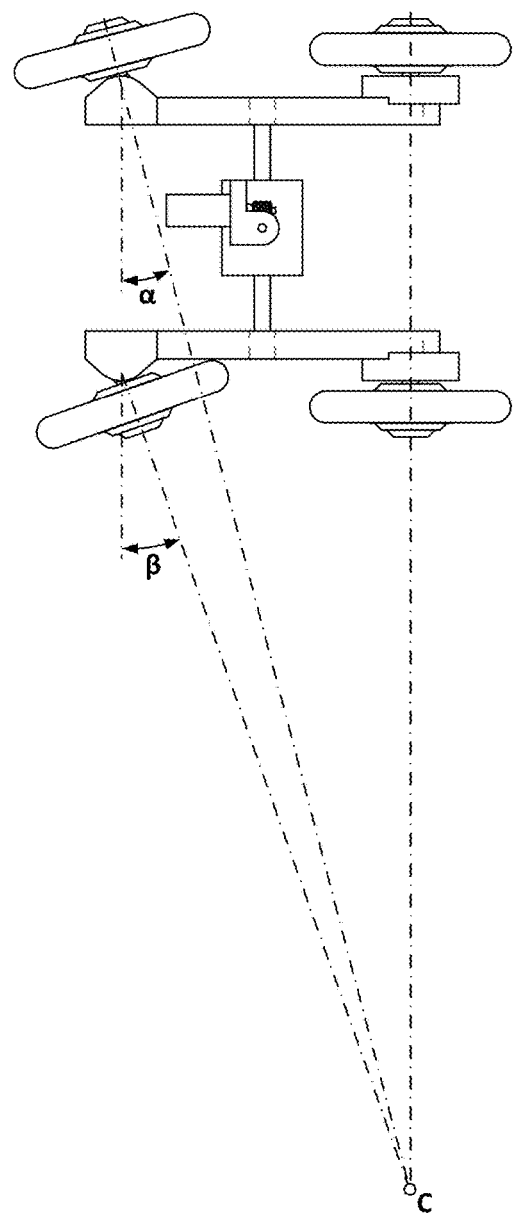
FIGS. 25 through 27 depict various example steering geometries.
Figure 26:
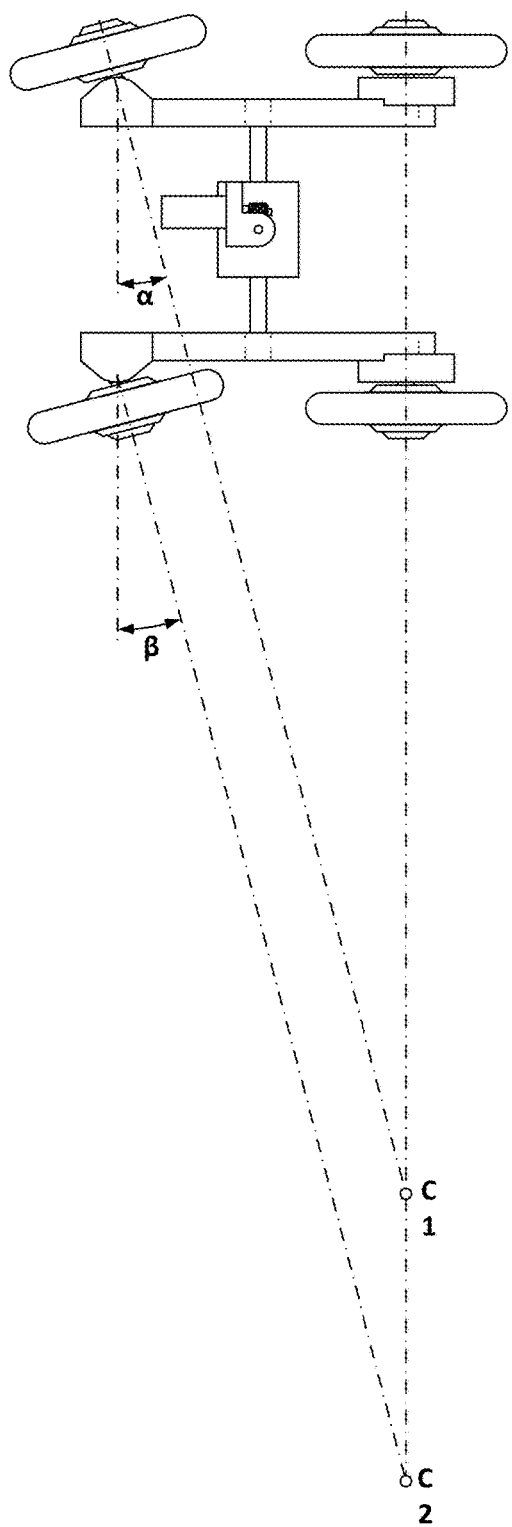
Figure 27:
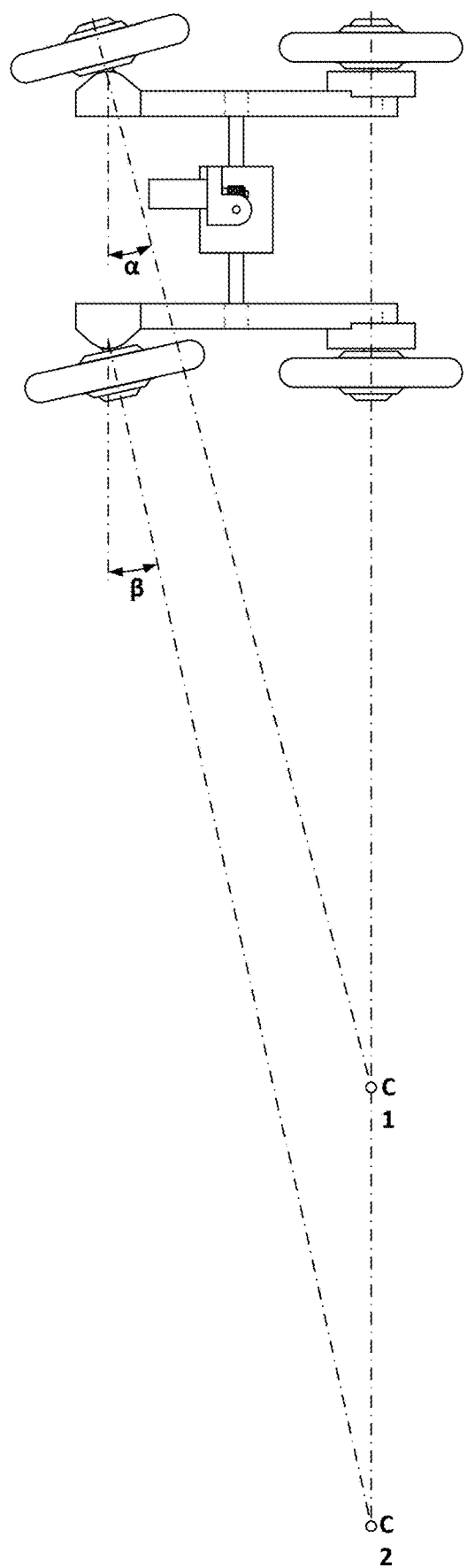

In a traditional steering mechanism, the steering angles adopted by two opposing steerable wheels are linked such that when either steerable wheel is steered to a particular steering angle, the other steerable wheel will always be caused to steer into a single, corresponding steering angle (which may or may not be the same steering angle). Thus, each steerable wheel's steering angle is a function of the other steerable wheel's steering angle. Depending on the particular steering geometry used in such traditional steering systems, the steering angles produced by a traditional steering mechanism may fall into several categories. FIGS. 25 through 27 depict various examples of different categories of steering angle paradigms that may be implemented in steering systems.

FIG. 25 depicts an example of what are commonly described as Ackermann steering angles. In an Ackermann steering geometry system, the steering linkage is designed so that when one of a pair of steerable wheels is turned to a particular steering angle, the other wheel of the pair of steerable wheels is caused to turn by a corresponding steering angle such that the rotational axes of the two steered wheels cross each other, when viewed from above, at a location that—in the ideal case—lies along the rotational axes of the non-steerable wheels (when viewed from above). Thus, all four wheels in an Ackermann steering geometry system will be rolling along concentric circular paths that are all centered on the point where the rotational axes of the wheels cross when viewed from above. Such an arrangement generally allows each wheel to roll without slipping during a turn, although dynamic loading during higher-speed turns may cause Ackermann steering geometry to be less effective. The steering geometry shown in FIG. 25 is representative of "true" Ackermann steering, but any steering geometry in which the steering angle of the "outer" steerable wheel (furthest from the center of the turn—angle $\alpha$ in FIG. 25) is less than the steering angle of the "inner" steerable wheel (angle $\beta$ in FIG. 25) may be referred to as an Ackermann steering geometry.

FIG. 26 depicts an example of what is commonly described as a parallel steering arrangement in which two opposing steerable wheels are caused to steer by the same amount and in the same direction (e.g., angle $\alpha$ in FIG. 26 equals angle $\beta$ in FIG. 26). Thus, the rotational axes of the steerable wheels will generally remain parallel for all steering angles of the steerable wheels.

FIG. 27 depicts an example of what is commonly called reverse Ackermann steering. In this steering geometry, the steering mechanism is configured such that the steering angle of the "outside" wheel (angle $\alpha$ in FIG. 27) is greater than that of the "inside" wheel (angle $\beta$ in FIG. 27). Such a steering geometry may be more effective in steering at higher speeds due to speed-dependent dynamic loading on the vehicle wheels.

In traditional steering mechanisms, the particular steering geometry that is implemented by a steering mechanism is generally fixed by the structure of the steering mechanism. Thus, for example, a steering mechanism that is set up to provide Ackermann steering angles will not be capable of providing parallel steering or reverse Ackermann steering geometries. Moreover, different steering geometries have different advantages and disadvantages under different circumstances, e.g., at different speeds and/or turn radii. Since the steering geometry that is provided by a particular traditional steering mechanism is essentially built-in to that steering mechanism, such steering mechanisms typically have particular "sweet spots" where their steering performance is at a maximum and their steering performance outside of those sweet spots may be reduced. In systems such as those discussed herein in which the steering angle of each steerable wheel may be separately controlled, the steering geometries that the controller causes to be adopted by the steerable wheels may be dynamically changed based on, for example, the vehicle's speed, thereby allowing a steering geometry to be selected and used that is most well-suited to the speed at which the vehicle is traveling.

Figure 28:
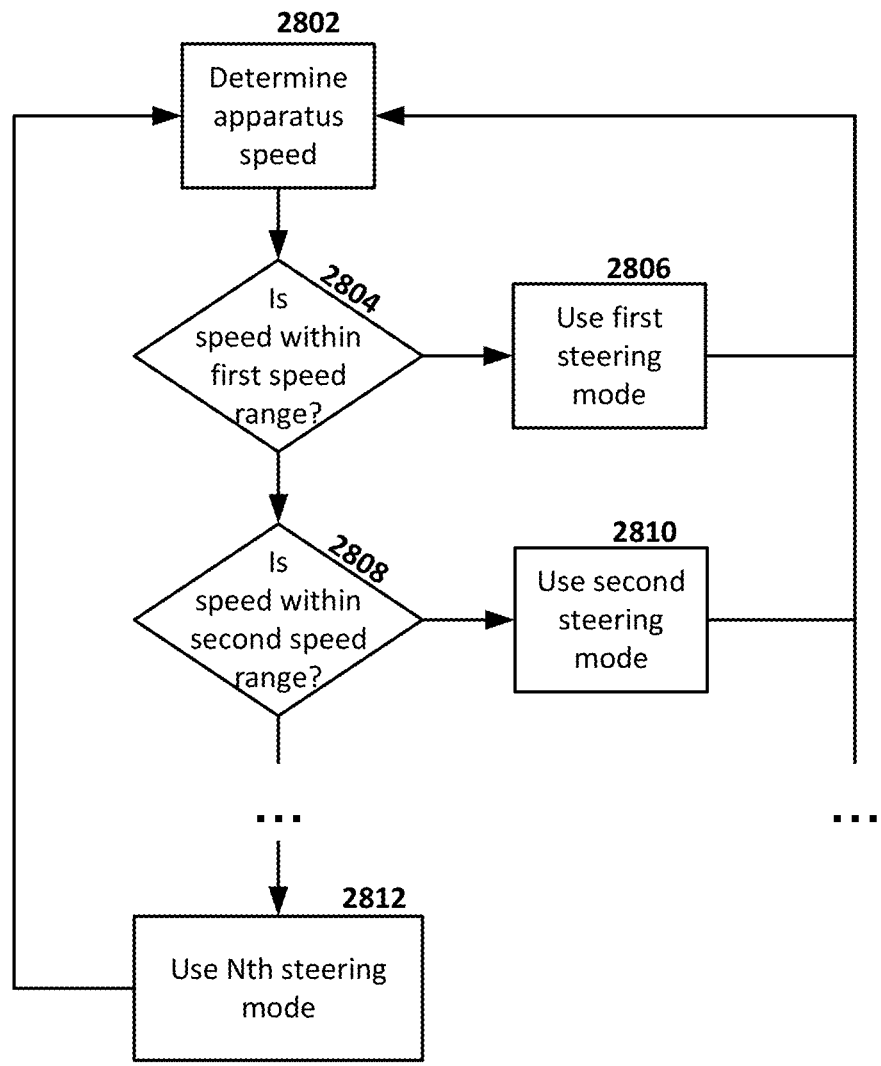
FIG. 28 depicts a flow chart for a technique for performing speed-dependent steering mode selection.

FIG. 28 depicts a flow chart of a technique for implementing dynamic steering geometry selection in an apparatus such as those discussed herein. In block 2802, a speed of the apparatus may be determined, e.g., based on wheel speed or other sensors (such as radar, imaging sensors, light detection and ranging (LIDAR), etc.). In block 2804, a determination may be made as to whether the speed of the apparatus from block 2802 is within a first speed range. If it is determined in block 2804 that the speed of the apparatus is within the first speed range, then the technique may proceed to block 2806, in which the controller may cause the steering actuators to be controlled according to a first steering mode before returning to block 2802. If it is determined in block 2804 that the speed of the apparatus is not within the first speed range, then the technique may proceed to block 2808, in which a determination may be made as to whether the speed of the speed of the apparatus from block 2802 is within a second speed range. If it is determined in block 2808 that the speed of the apparatus is within the second speed range, then the technique may proceed to block 2810, in which the controller may cause the steering actuators to be controlled according to a second steering mode before returning to block 2802.

It will be understood that the technique may involve any number of decision/speed evaluation blocks such as blocks 2804 or 2808, with each block comparing the measured speed against a predetermined speed range and, if the speed falls within the associated speed range, causing the controller to control the steering actuators according to a particular steering mode that corresponds with that speed range. Ultimately, if the speed does not fall within any of the specific ranges evaluated, the controller may cause the steering actuators to be controlled according to a default steering mode or, alternatively, the ranges may be selected so as to cover all potential speeds of the vehicle such that there is an explicitly defined steering mode associated with each possible speed (as opposed to there being a "default" steering mode that is applied if the speed falls within none of the evaluated speed ranges).

There may, as shown in FIG. 28, be three different steering modes (where N=3), as few as two steering modes (in which case blocks 2808 and 2810 may be omitted), or four or more steering modes. Each of the steering modes, when active, may cause the controller to actuate the steering actuators to produce a different type of corresponding steering geometry. For example, if the first speed range is between 0 and 10 mph, the first steering mode may cause the controller to actuate the steering actuators so as to produce steering angles consistent with an Ackermann steering geometry when the vehicle speed is between 0 and 10 mph and then cause the controller to actuate the steering actuators to produce steering angles consistent with a negative Ackermann steering geometry when the vehicle speed is greater than 10 mph.

It will be understood that there may be any number of steering modes that the controller may be caused to engage depending on the speed of the apparatus. For example, there may be a plurality of different steering modes that each cause the steering angles for the steerable wheels to be controlled according to different Ackermann steering geometries, e.g., one steering mode in which the steering actuators are controlled to produce true Ackermann steering angles, one or more additional steering modes in which the steering actuators are controlled to produce steering angles in which the difference between the steering angles is, for each such additional steering mode, a different percentage of the difference between the true Ackermann steering angles for those wheels for a given vehicle heading. Such a system thus allows for the steering system to gradually change the steering geometries used based on speed of the apparatus, allowing for potentially smoother transitions between steering geometries. For example, instead of suddenly switching from a steering mode in which true Ackermann steering angles are used for speeds between 0 and 10 mph to a steering mode in which reverse Ackermann steering angles are used for speeds above 10 mph, such a system may instead be configured to use the true Ackermann steering mode for speeds between 0 and 7 mph but then sequentially apply multiple steering modes at speeds above 7 mph and up to 10 mph that are each configured to cause the steering actuators to generate steering angles that are increasingly further and further from true Ackermann steering angles (and closer and closer to parallel steering angles or reverse Ackermann steering angles) as the speed approaches 10 mph. It will also be understood that the example speeds discussed above are simply examples and that the various speed ranges associated with each steering mode may be selected according to the speeds at which the steering angles associated with that steering mode are, for example, most effective. This may be highly dependent on the particular geometry of the vehicle, e.g., wheelbase and track, and is thus not limited to a particular value or values that is or are generally applicable across all vehicle implementations.

Another system that may be used in apparatuses with independently steerable wheels is a closed-loop control system. In traditional steering systems in which a pair of steerable wheels are steered in tandem by a common mechanical steering system, the steering angles of the two wheels are linked together in a way that makes it impossible—aside from minor variations that may occur due to tolerances or mechanical slop (or larger variations that may arise due to component failure that may result in one or both of the steerable wheels no longer being controllable at all via the steering system)—for the steering angles of the steerable wheels to adopt any other relative positioning for a given actuation state of the steering system. In contrast, systems such as those discussed herein that feature an independently controllable steering actuator for each steerable wheel can experience situations in which one or both of the steerable wheels actually deviate from the desired angular positions for those wheels during a turn. For example, if one steering actuator experiences exhibits slower-than-expected response time, the steerable wheel steered by that actuator may have a steering angle that lags the steering angle of the other steerable wheel—in such an instance, the steady state steering angles that are ultimately adopted by the two steerable wheels (assuming that a steady state steering angle is being used) may be the desired steering angles, e.g., true Ackermann steering angles, but the steering angles of the two steerable wheels at any given point in time during the transition to those desired steering angles may not be true Ackermann steering angles.

Figure 29:
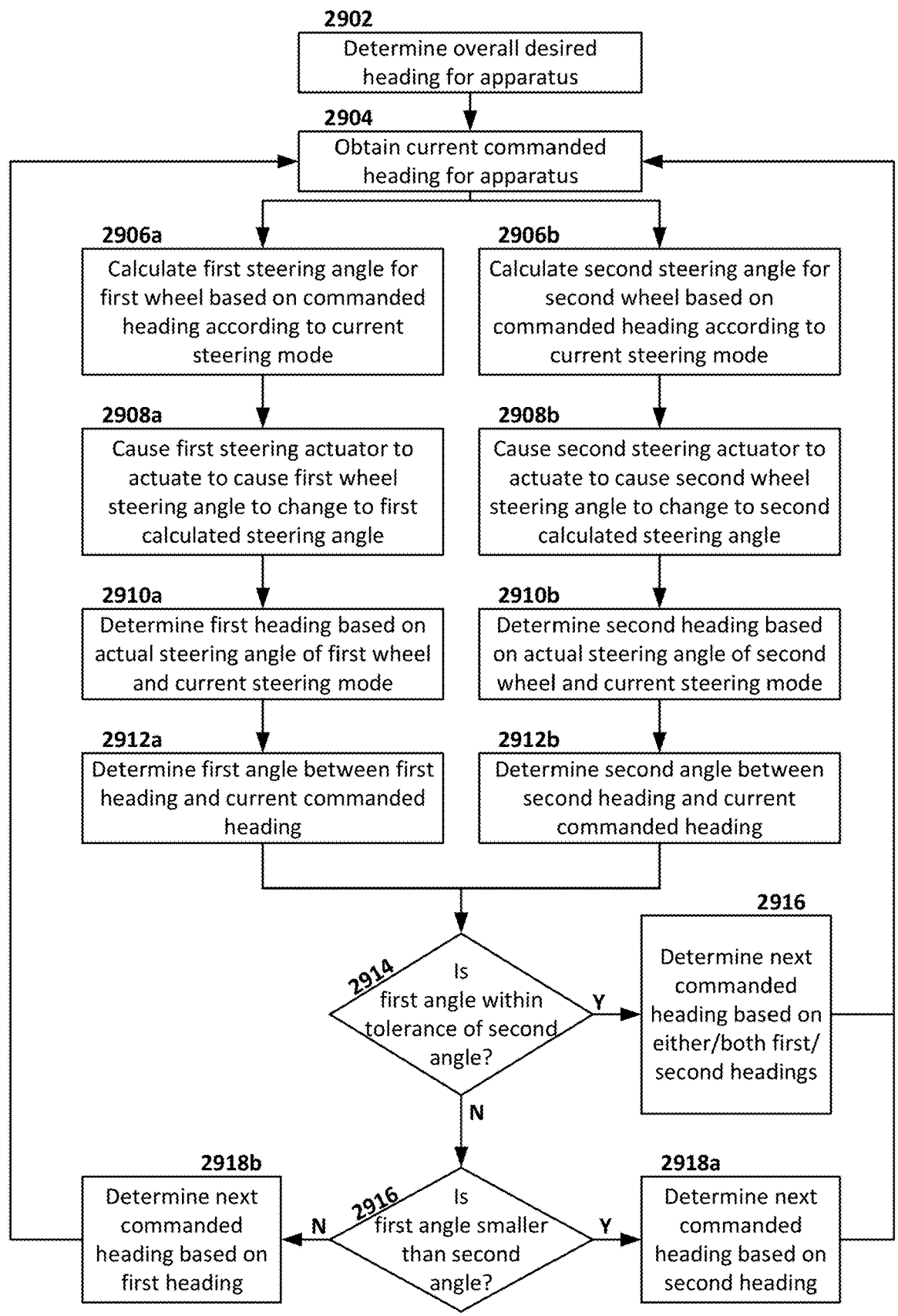
FIG. 29 depicts a flow chart for a closed-loop steering control technique.

A closed-loop control algorithm may be used to actively compensate for such situations during actuation of a steering system featuring a pair of independently steerable wheels. FIG. 29 depicts a flow diagram for an example of such a control technique, although it will be appreciated that other control algorithms may be used to similar effect, and that this disclosure is not limited to the particular technique illustrated in FIG. 29.

In such a system, a desired heading angle for the apparatus may be determined, e.g., based on a determination from a navigation system, in block 2902. The desired heading angle may represent a vector that is tangent to a desired path that the apparatus is to follow for a given time interval. The closed-loop control algorithm (or a controller that implements, in hardware and/or software, such an algorithm) may determine, in block 2904, a commanded heading that the apparatus should be caused to adopt in order to facilitate reaching the desired heading from the current heading. For example, if the desired heading angle is 10° and the current heading is 0°, the control algorithm may interpolate the heading change into smaller commanded heading increments, causing the heading to gradually change over a given time interval. For example, a navigation system may be configured to provide desired heading updates at a frequency of 10 Hz to the closed-loop control algorithm. The controller that implements the control algorithm may, in turn, operate at a frequency of 100 Hz and may, in the example of a heading of 10° noted above, determine that such a heading is to be attained by changing the heading in 1° increments during each operational cycle of the controller, e.g., via commanded headings of +1° per cycle.

Once the commanded heading is obtained, the technique may proceed to blocks 2906a and 2906b, in which the controller may calculate the steering angles that the steerable wheels will theoretically need to be steered to in order to cause the apparatus to adopt the current commanded heading. Such steering angle calculations may be determined according to the particular steering mode that is being used, e.g., the particular steering geometry that the actuators are being controlled to adopt (e.g., true Ackermann steering, parallel steering, reverse Ackermann steering, etc.). Thus, for a given commanded heading, two different (or, for parallel steering, identical) steering angles may be determined, one for each steerable wheel. Blocks 2906 through 2912 are each performed for each wheel, with one set of blocks having an "a" suffix to indicate that they are performed for the first wheel, and the other set of blocks having a "b" suffix to indicate that they are performed for the second wheel. It will be appreciated that some or all of these blocks may be performed in parallel or series with their counterpart blocks having the other suffix, if desired.

In blocks 2908, the controller may cause the first and second steering actuators to actuate so as to cause the respective steerable wheels that are steered thereby to rotate to the calculated steering angle (or, more specifically, send signals that should cause those steering actuators to rotate to the respective steering angles for those respective wheels). For example, the first steering actuator may be caused to rotate the wheel connected therewith to the first calculated steering angle, and the second steering actuator may be caused to rotate the wheel connected therewith to the second calculated steering angle.

In blocks 2910, the controller may obtain the actual steering angles of both steerable wheels, e.g., from a rotational encoder or other angular position-sensing sensor that is able to determine what the actual steering angle α respective one of the steering wheels is in. It is important to realize that the actual steering angle that a steerable wheel is in may not match the steering angle that the steerable wheel is supposed to be in based on the inputs provided by the associated steering actuator. For example, the steering actuator may be provided with an input that should cause the steering actuator to turn the wheel by 1°, but due to wear and tear on the steering actuator, or perhaps increased loading on the wheel, the amount that the wheel actually steers by is actually 0.9°. The controller may then determine separate theoretical headings for the apparatus based on the current steering mode and the actual steering angles of each wheel.

For example, if the current steering mode in a bogie-equipped vehicle having a track to wheelbase ratio of 3:4 is true Ackermann steering and a first wheel of the steerable wheels has a steering angle of 40° (the first wheel in this example being the inner wheel during a turn), then the second wheel of the steerable wheels should necessarily have a steering angle of 27.3° under that steering mode assuming that the second wheel actually moved consistent with that steering mode. Furthermore, the theoretical apparatus heading (which is generally evaluated with respect to a particular point in space relative to the apparatus—in this example, the headings are evaluated at a location that is in the center of the track/wheelbase of the apparatus) that would result from actual true Ackermann steering based on the actual steering angle of the first wheel should be 17.7°.

If the second wheel were to have an actual steering angle of 27.3° in such an example, then the steerable wheels would actually be engaging in actual true Ackermann steering. However, for various reasons, the two steering angles of the steerable wheels may not always be consistent with the motion characteristics of the current steering mode. For example, if the actual steering angle of the second wheel is 20° instead of 27.3° in the example above, then the first wheel should, assuming that the current steering mode is being adhered to, have a steering angle of 26.6° and the theoretical heading based on the current steering mode and the current steering mode should be 11.9°.

In blocks 2912, the headings that are calculated with respect to the actual steering angles of both steerable wheels are compared against the current commanded heading in order to determine respective angles between the calculated headings for each of the two steerable wheels and the current commanded heading. Thus, there will be a first angle that represents the angular distance between the current commanded heading and the first heading based on the first wheel position, and a second angle that represents the angular distance between the current commanded heading and the second heading based on the second wheel position.

In block 2914, the first angle and the second angle may be compared to one another to see whether the two angles are within a predetermined tolerance of one another, e.g., within 5% of each other. If so, then this may be interpreted by the controller as indicating that the two steerable wheels are actually demonstrating steering performance that is consistent with the current steering mode and that no left/right correction to steering angle is needed. In this case, the technique may proceed to block 2916, in which the next commanded heading may be determined based on, for example and at least in part, either or both of the first heading and the second heading (for example, since both are generally the same, either may be viewed as being representative of the other—alternatively, the first and second headings may be averaged and the average heading then used, at least in part, to determine the next commanded heading). Once the next commanded heading is determined, the technique may return to block 2904 and be repeated for the next time step.

If it is determined in block 2914 that the first angle and the second angle are outside of the predetermined tolerance from one another, then this may be interpreted by the controller as being indicative of a situation in which one of the two steerable wheels is lagging or leading the other with respect to where they should be positioned with respect to steering angle given the current steering mode. In such situations, the technique may proceed to block 2916, in which a determination may be made as to whether the first angle is smaller than the second angle. If it is, then the technique may proceed to block 2918*a* in which the next commanded heading may be determined based at least in part on the second heading. This generally represents the case in which the second wheel is lagging the first wheel with respect to the steering angles that each is supposed to be at under the constraints of the current steering mode. In such situations, it is generally not possible to cause the second wheel to make up the difference since whatever is causing the lag will likely prevent the even quicker or larger movements that would be needed to "catch up" the second wheel to where it is supposed to be. Accordingly, the controller may instead cause the next commanded heading to be determined based at least in part on the second heading, which may allow the first and second wheels to be steered in a way that is consistent with the current steering mode.

If it is determined in block 2916 that the first angle is greater than the second angle, then the technique may proceed to block 2918*b*, in which the next commanded heading may be determined based at least in part on the second heading (similar to what was done in block 2918*a*, but for the other heading). In such situations, it is generally not possible to cause the first wheel to make up the difference since whatever is causing the lag will likely prevent the even quicker or larger movements that would be needed to "catch up" the first wheel to where it is supposed to be. Accordingly, the controller may instead cause the next commanded heading to be determined based at least in part on the first heading, which may allow the first and second wheels to be steered in a way that is consistent with the current steering mode.

It will be understood that the above closed-loop control algorithm may be used with a variety of different steering modes, not necessarily just an Ackermann steering mode as discussed above. The technique may be used to provide for more reliable steering performance in a steering system in which the steering angles of the steerable wheels are not physically constrained to one another by virtue of a common mechanical actuation system.

Another closed-loop control algorithm that may be used in bogie-equipped vehicle systems is an algorithm that controls the wheel speeds of the wheels of the vehicle according to, for example, the steering mode currently in use (and the current steering angles in use).

Figure 30A:
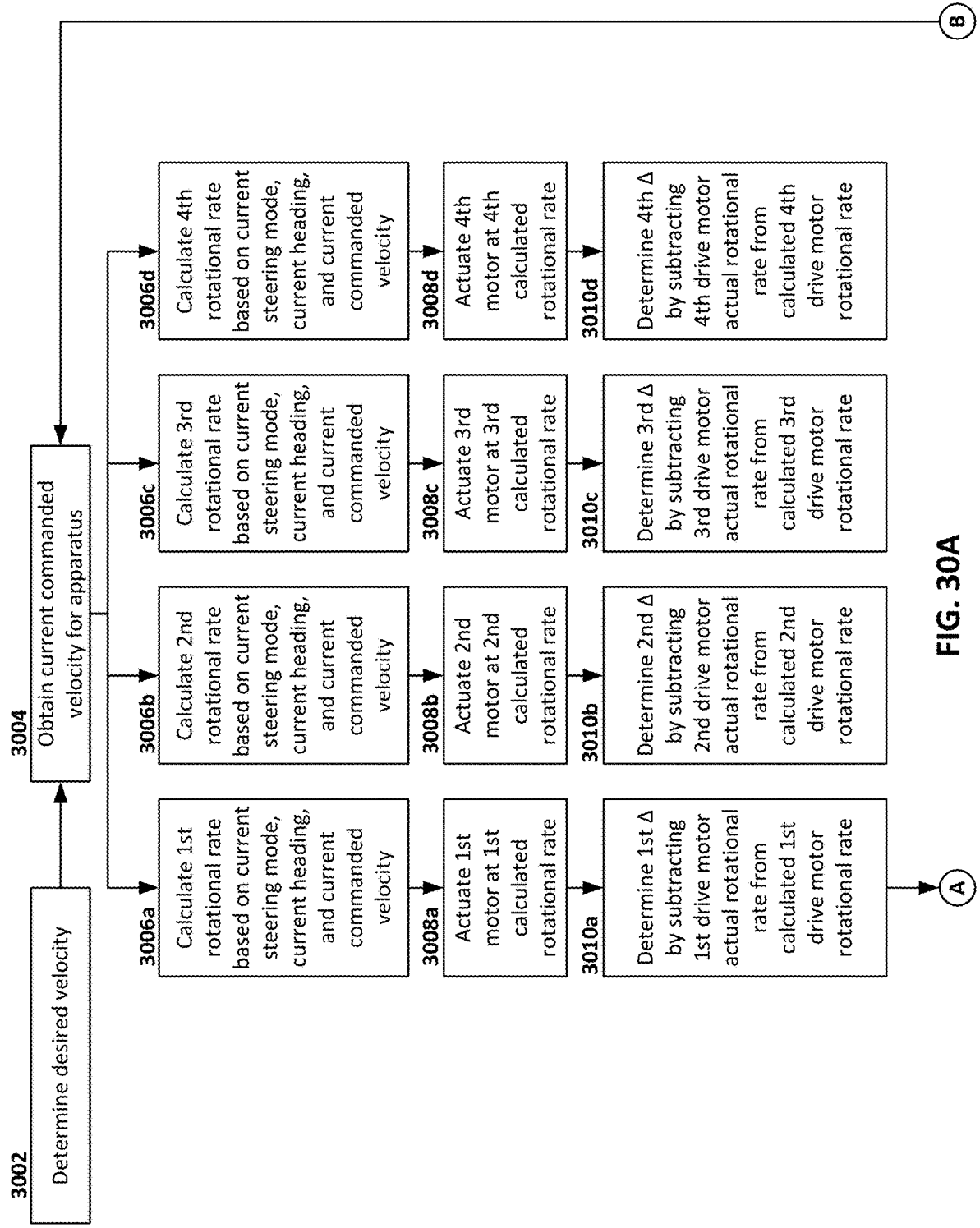
FIGS. 30A and 30B depict a flow chart for a closed-loop wheel speed control technique.
Figure 30B:
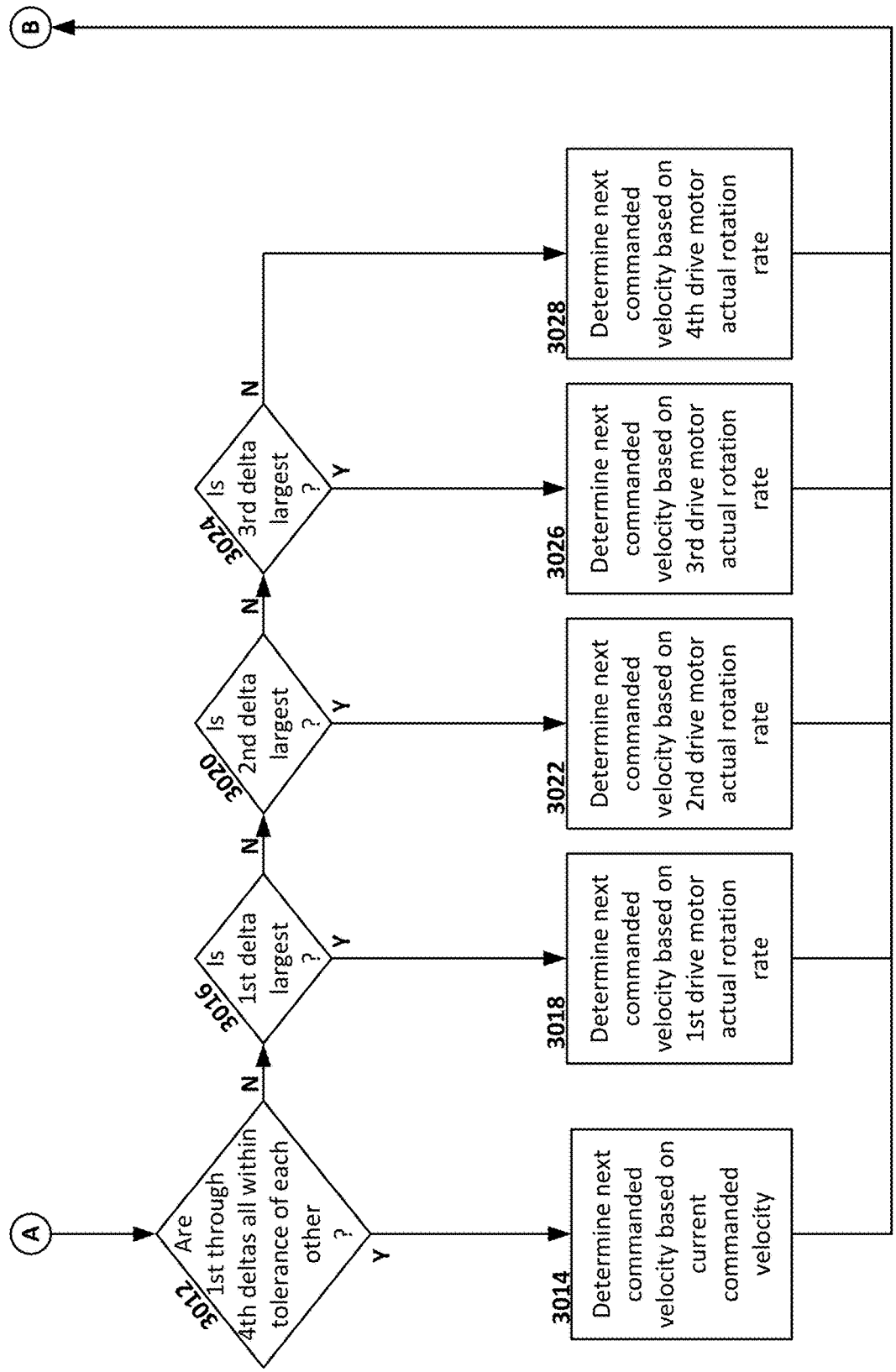

FIG. 30 (which is split into FIGS. 30A and 30B) depicts a flow diagram for a wheel speed closed-loop control technique that may be practiced in bogie-equipped vehicles having a separately controllable drive motor for each of four wheels. In block 3002, a desired velocity for the apparatus may be determined. In block 3004, the controller may determine a current commanded velocity for the apparatus for the current execution cycle of the technique, e.g., similar to what was discussed earlier with respect to the commanded heading.

In blocks 3006, separate determinations of what the different wheel speeds should be, and thus what the rotational rates for each wheel should be, may be made according to the current commanded velocity and the current steering mode. For example, the outer wheels in a turn will roll along paths that have larger effective radii than the paths along which the inner wheels roll along. As a result, the outer wheels will—assuming no wheel slip occurs—need to travel further for a given portion of a turn than the inner wheels. There may also be fore/aft speed differences, e.g., the front wheels may (at least in front-steer, two-wheel steering systems) follow paths that have larger effective radii than the paths followed by their rear wheel counter parts (for example, the front inner wheel will follow a path having a larger effective radius than the rear inner wheel). Accordingly, each wheel of the vehicle may, for a given turn, experience different amounts of rotation during the turn. Correspondingly, each wheel should, assuming no wheel slip, also experience proportionately different velocities (and thus wheel rotation rates) during the turn. These wheel rotation rates may be calculated based on the current commanded velocity for the vehicle, the heading, and the steering mode that is currently in use.

In blocks 3008, the controller may cause each drive motor for each wheel to be actuated at the rotational rate corresponding to that wheel. Thus, the first drive motor may be caused to actuate at the first rotational rate, the second drive motor at the second rotational rate, and so forth.

In blocks 3010, the controller may determine, based on wheel speed sensors for each of the wheels, a difference between the actual rotational rate of each wheel and the rotational rate that was calculated in blocks 3006. For example, a first delta may be determined in block 3010*a* for the first wheel by subtracting the actual rotational rate of the first wheel from the calculated first rotational rate of block 3006*a*. Similarly, a second delta may be determined in block 3010*b* for the second wheel by subtracting the actual rotational rate of the second wheel from the calculated second rotational rate of block 3006*b*.

In block 3012, a determination may be made as to whether all four of the deltas determined in blocks 3010 are within some tolerance of one another, e.g., all within 5% of one another. If so, then the technique may proceed to block 3014, in which the next commanded velocity may be determined based on, at least in part, one or more of the four actual wheel speeds (for example, an average velocity for the apparatus may be determined based on the four actual wheel speeds). The technique may then return to block 3004 and be repeated for the next control cycle.

If it is determined in block 3012 that at least two of the deltas are not within the predetermined tolerance of each other, the technique may proceed to blocks 3016-3024, in which the deltas may be evaluated to see which has the largest value. Generally speaking, the largest delta will indicate the wheel that is lagging the most behind the other wheels. The technique may then proceed to blocks 3018-3028, as appropriate, in which the next commanded velocity may be determined based, at least in part, on the current actual rotation rate of the wheel that is lagging the most behind the other wheels. This has the effect of generally scaling down the velocities in question such that the slowest wheel sets the pace for the remaining wheels, thereby avoiding situations in which one or more wheels may skid or freewheel, which may compromise steering stability.

It will be appreciated that the various techniques discussed herein may be implemented in a variety of ways, including via software, hardware, application-specific integrated circuits, analogue circuits, combinations of two or more thereof, or other systems capable of being used to perform the technique discussed above.

It will also be appreciated that the techniques, systems, and apparatuses discussed herein may be implemented separately in various vehicles or in various combinations or sub-combinations in vehicles.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

What is claimed is:

1. An apparatus comprising:
   a first bogie that includes a corresponding bogie structure, a corresponding first axle, and a corresponding second axle;
   a second bogie that includes a corresponding bogie structure, a corresponding first axle, and a corresponding second axle;
   a chassis;
   a first pair of wheels associated with the corresponding bogie structure of the first bogie;
   a second pair of wheels associated with the corresponding bogie structure of the second bogie;
   a first set of one or more drive motors;
   a second set of one or more drive motors; and
   a controller that includes one or more processors and one or more memory devices, wherein:
   the first bogie and the second bogie are both connected with the chassis and are located on opposite sides of the chassis with the first axles of each positioned at the same end,
   the first bogie includes a corresponding first steering actuator that is configured to cause the corresponding first axle of the first bogie to change its steering angle relative to the corresponding bogie structure of the first bogie responsive to one or more control signals received from the controller,
   the second bogie includes a corresponding first steering actuator configured to cause the corresponding first axle of the second bogie to change its steering angle relative to the corresponding bogie structure of the second bogie responsive to one or more control signals received from the controller, each wheel in the first pair of wheels is connected with a different one of the first axle and the second axle of the first bogie, each wheel in the second pair of wheels is connected with a different one of the first axle and the second axle of the second bogie, at least one drive motor of the first set of one or more drive motors is configured to drive one of the wheels in the first pair of wheels responsive to control signals received from the controller, and at least one drive motor of the second set of one or more drive motors is configured to drive one of the wheels in the second pair of wheels responsive to control signals received from the controller.

2. The apparatus of claim 1, further comprising:

a differential mechanism that has a first rotatable part and a second rotatable part, wherein:

the first bogie is fixedly mounted with respect to the first rotatable part, the second bogie is fixedly mounted with respect to the second rotatable part, and the differential mechanism is configured to cause the first rotatable part and the second rotatable part to rotate in opposite directions, and by equal amounts, about a common axis relative to the chassis when either the first rotatable part or the second rotatable part is caused to rotate relative to the chassis.

3. The apparatus of claim 2, wherein:

the differential mechanism includes a first side gear, a second side gear, and a pinion gear, the first side gear is connected with the first rotatable part such that the first side gear and the first rotatable part rotate about the common axis in unison when either of the first side gear and the first rotatable part is caused to rotate about the common axis, the second side gear is connected with the second rotatable part such that the second side gear and the second rotatable part rotate about the common axis in unison when either of the second side gear and the second rotatable part is caused to rotate about the common axis, and the pinion gear is meshed with the first side gear and with the second side gear such that when any of the pinion gear, the first side gear, and the second side gear is caused to rotate relative to the chassis, the pinion gear, the first side gear, and the second side gear all turn in unison with the first side gear and the second side gear turning in opposite directions about the common axis.

4. The apparatus of claim 3, wherein:

the differential mechanism further includes a differential actuator configured to provide a rotational input to the pinion gear responsive to receipt of one or more control signals from the controller.

5. The apparatus of claim 4, wherein the differential mechanism further includes a slip mechanism that couples a driven output of the differential actuator with the pinion gear such that the pinion gear is rotatable through a first angular range of motion even when the driven output of the differential actuator is held stationary relative to a housing of the differential actuator.

6. The apparatus of claim 5, wherein the slip mechanism is provided, at least in part, by at least one positive stop that is fixed with respect to one of the pinion gear and the driven output of the differential actuator and, at least in further part, by two stop surfaces that are fixed with respect to the other of the pinion gear and the driven output, wherein each of the stop surfaces is positioned so as to contact at least part of the at least one positive stop when the pinion gear is at a different opposing limit of the first angular range of motion and prevent the contacted part of the at least one positive stop from moving past that contacted stop surface.

7. The apparatus of claim 4, wherein:

the differential mechanism allows the differential actuator to be back-drivable, and the one or more memory devices store computer-executable instructions which, when executed by the one or more processors, cause the one or more processors to cause:

information indicative of a first rate of rotational motion of at least one of the rotatable parts relative to the chassis to be obtained from a sensor, and the differential actuator to be operated in i) a first state while the apparatus is in a first mode and while the first rate of rotational motion is within a first threshold range and ii) a second state while the apparatus is in the first mode and while the first rate of rotational motion is within a second threshold range higher than the first threshold range, wherein:

the differential actuator, in the first state, is provided with a sinusoidal current having an amplitude that is slightly less than a first current needed to cause the differential mechanism to transition from a stationary state to an in-motion state when the wheels are unloaded, and the differential actuator, in the second state, is provided with a current having a magnitude and direction that is slightly less than a second current needed to cause the rotatable parts to remain in motion relative to the chassis.

8. The apparatus of claim 7, wherein the one or more memory devices further store computer-executable instructions which, when executed by the one or more processors, cause the one or more processors to cause the apparatus to be operated in a second mode in which the differential actuator is provided with a current having a magnitude that exceeds the first current.

9. The apparatus of claim 4, wherein the one or more memory devices store computer-executable instructions which, when executed by the one or more processors, cause the one or more processors to cause the apparatus to control the differential actuator to:

cause the first bogie and the second bogie to undergo a plurality of rotations relative to the chassis so as to cause at least three of the wheels to be sequentially lifted off of a surface on which the wheels are resting, wherein the fourth wheel is caused to lift off of the surface either in tandem with the wheel that is sequentially in the middle or in sequence with the other three wheels, and cause at least one motor in the first set of one or more drive motors, the second set of one or more drive motors, or the first and second sets of one or more drive motors actuate so as to cause the apparatus to move each of the wheels onto an elevated feature after being lifted off of the surface.

10. The apparatus of claim 4, wherein the one or more memory devices store computer-executable instructions which, when executed by the one or more processors, cause the one or more processors to cause:

a) at least one motor in the first set of one or more drive motors, the second set of one or more drive motors, or the first and second sets of one or more drive motors to actuate and cause the apparatus to approach an elevated feature that is at a higher elevation than a surface that is supporting the wheels, b) one of the first bogie and the second bogie to be selected as a leading bogie and the other of the first bogie and the second bogie to be selected as a trailing bogie, c) at least one motor in the first set of one or more drive motors, the second set of one or more drive motors, or the first and second sets of one or more drive motors actuate so as to cause the apparatus to position itself on the surface and relative to the elevated feature such that one of the wheels on the leading bogie associated with a first end of the chassis is closer to the elevated feature than the wheel on the trailing bogie that is also associated with the first end of the chassis, d) the differential actuator to actuate so as to cause the leading bogie to rotate in a first direction so that the wheel on the leading bogie that is closer to the elevated feature moves towards the chassis and so as to cause the trailing bogie to rotate in a second direction opposite from the first direction so that the wheel on the trailing bogie that is also associated with the first end of the chassis moves away from the chassis, e) at least one motor in the first set of one or more drive motors, the second set of one or more drive motors, or the first and second sets of one or more drive motors to actuate so as to cause the apparatus to move in a first direction such that the wheel on the leading bogie that is closer to the elevated feature moves over or onto the elevated feature, f) the differential actuator to actuate so as to cause the leading bogie to rotate in the second direction so that the wheel on the leading bogie that is over or on the elevated feature moves away from the chassis and so as to cause the trailing bogie to rotate in the first direction so that the wheel on the trailing bogie that is also associated with the first end of the chassis moves towards the chassis, g) at least one motor in the first set of one or more drive motors, the second set of one or more drive motors, or the first and second sets of one or more drive motors to actuate so as to cause the apparatus to further move in the first direction such that the wheel on the trailing bogie that is associated with the first end of the chassis moves over or onto the elevated feature, h) the differential actuator to actuate so as to cause the leading bogie to further rotate in the second direction and the trailing bogie to further rotate in the first direction so that the wheel on the leading bogie that is on the surface moves further towards the chassis and so that the other wheel that is on the surface moves further away from the chassis, i) at least one motor in the first set of one or more drive motors, the second set of one or more drive motors, or the first and second sets of one or more drive motors to actuate so as to cause the apparatus to further move in the first direction such that the wheel on the leading bogie that is not associated with the first end of the chassis moves over or onto the elevated feature, j) the differential actuator to actuate so as to cause the leading bogie to rotate in the first direction and the second bogie to rotate in the second direction so that the wheel that is on the surface moves toward the chassis, and k) at least one motor in the first set of one or more drive motors, the second set of one or more drive motors, or the first and second sets of one or more drive motors to actuate so as to cause the apparatus to further move in the first direction such that all four wheels move over or onto the elevated feature.

11. The apparatus of claim 1, wherein the one or more memory devices store computer-executable instructions which, when executed by the one or more processors, cause the one or more processors to cause the apparatus to:

obtain information regarding a speed of the apparatus;

select a selected steering mode from a plurality of different steering modes based on the speed of the apparatus, the plurality of different steering modes including at least a first steering mode and a second steering mode; and cause the first steering actuators to change the steering angles of the first axles according to the selected steering mode, wherein the steering angle for each first axle as a function of the steering angle of the other first axle is different in each steering mode.

12. The apparatus of claim 11, wherein, when the apparatus is caused to undergo a turn, the first steering actuators are caused to change the steering angles of the first axles such that the wheel that is connected with one of the first axles and furthest from a center of the turn has a first steering angle and the wheel that is connected with the other of the first axles has a second steering angle, and wherein, in the first steering mode, the first steering angle is less than the second steering angle.

13. The apparatus of claim 12, wherein, in the first steering mode, the first steering angle and the second steering angle are selected such that, when viewed from above, rotational axes of the wheels connected with the first axles cross over each other at a location that is nominally over rotational axes of the wheels connected with the second axles.

14. The apparatus of claim 12, wherein, in the second steering mode, the first steering angle is greater than or equal to the second steering angle.

15. The apparatus of claim 13, wherein, in the second steering mode, the first steering angle is equal to the second steering angle.

16. The apparatus of claim 13, wherein, in the second steering mode, the first steering angle is greater than the second steering angle.

17. The apparatus of claim 1, wherein the one or more memory devices store computer-executable instructions which, when executed by the one or more processors, cause the one or more processors to cause the apparatus to constrain the actuation of the steering actuators such that the steering angles that the steering actuators cause the wheels to be actuated to are determined based on the actual steering angle of one of the wheels.

18. The apparatus of claim 1, wherein:

each first axle is connected with a corresponding upright that is rotatable relative to the corresponding bogie structure, each upright is connected with a corresponding steering pinion gear, and the first steering actuators each have rotational outputs that are connected with a corresponding steering worm gear that is meshed with the corresponding steering pinion gear for one of the uprights.

19. The apparatus of claim 18, wherein the one or more memory devices store computer-executable instructions which, when executed by the one or more processors, cause the one or more processors to cause the apparatus to:

enter a park mode by causing the first steering actuators to change the steering angles of the first axles such that rotational axes of the wheels connected with the first axles, when viewed from above, cross over one another at a location inboard of the wheels.

20. The apparatus of claim 19, further comprising one or more batteries, wherein the one or more memory devices store computer-executable instructions which, when executed by the one or more processors, further cause the one or more processors to cause the apparatus to:

obtain information regarding a battery charge level of the one or more batteries, determine if the battery charge level of the one or more batteries is below a first threshold amount, and cause the apparatus to enter the park mode responsive to determining that the battery charge level is below the first threshold amount.

21. The apparatus of claim 1, wherein:

the first bogie includes a corresponding second steering actuator that is configured to cause the corresponding second axle of the first bogie to change its steering angle relative to the corresponding bogie structure of the first bogie responsive to one or more control signals received from the controller, and the second bogie includes a corresponding second steering actuator configured to cause the corresponding second axle of the second bogie to change its steering angle relative to the corresponding bogie structure of the second bogie responsive to one or more control signals received from the controller.

22. An apparatus comprising:

a first bogie that includes a corresponding bogie structure, a corresponding first axle, and a corresponding second axle;

a second bogie that includes a corresponding bogie structure, a corresponding first axle, and a corresponding second axle;

a chassis;

a first pair of wheels associated with the corresponding bogie structure of the first bogie;

a second pair of wheels associated with the corresponding bogie structure of the second bogie;

a first set of one or more drive motors;

a second set of one or more drive motors;

a differential mechanism that has a first rotatable part and a second rotatable part; and a controller that includes one or more processors and one or more memory devices, wherein:

the first bogie and the second bogie are both connected with the chassis and are located on opposite sides of the chassis with the first axles of each positioned at the same end, the first bogie is fixedly mounted with respect to the first rotatable part, the second bogie is fixedly mounted with respect to the second rotatable part, the differential mechanism is configured to cause the first rotatable part and the second rotatable part to rotate in opposite directions, and by equal amounts, about a common axis relative to the chassis when either the first rotatable part or the second rotatable part is caused to rotate relative to the chassis, each wheel in the first pair of wheels is connected with a different one of the first axle and the second axle of the first bogie, each wheel in the second pair of wheels is connected with a different one of the first axle and the second axle of the second bogie, at least one drive motor of the first set of one or more drive motors is configured to drive one of the wheels in the first pair of wheels responsive to control signals received from the controller, and at least one drive motor of the second set of one or more drive motors is configured to drive one of the wheels in the second pair of wheels responsive to control signals received from the controller.

* * * * *